(12) United States Patent
Hamlin et al.

(10) Patent No.: US 12,189,543 B2
(45) Date of Patent: Jan. 7, 2025

(54) SYSTEMS AND METHODS FOR MANAGING PERIPHERAL DEVICE SETTINGS BASED UPON CONTEXT USING HETEROGENEOUS COMPUTING PLATFORMS

(71) Applicant: Dell Products, L.P., Round Rock, TX (US)

(72) Inventors: Daniel L. Hamlin, Round Rock, TX (US); Srikanth Kondapi, Austin, TX (US); Todd Erick Swierk, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 82 days.

(21) Appl. No.: 18/172,032

(22) Filed: Feb. 21, 2023

(65) Prior Publication Data

US 2024/0281385 A1 Aug. 22, 2024

(51) Int. Cl.
*G06F 13/10* (2006.01)
(52) U.S. Cl.
CPC .................... *G06F 13/10* (2013.01)
(58) Field of Classification Search
CPC ............... G06F 13/10; G06F 9/4411
See application file for complete search history.

(56) References Cited

U.S. PATENT DOCUMENTS

| | | | |
|---|---|---|---|
| 2008/0016328 A1* | 1/2008 | Taeshima | G06F 9/4403 712/220 |
| 2011/0207449 A1* | 8/2011 | Shin | H04M 1/72463 455/419 |
| 2021/0026460 A1* | 1/2021 | Iyer | H04L 41/0806 |
| 2022/0051196 A1* | 2/2022 | Gatson | H04L 12/1818 |

* cited by examiner

Primary Examiner — Stefan Stoynov
(74) Attorney, Agent, or Firm — Fogarty LLP

(57) ABSTRACT

Systems and methods for managing peripheral device settings based upon context using heterogeneous computing platforms are described. In an illustrative, non-limiting embodiment, an Information Handling System (IHS) may include a heterogeneous computing platform and a memory coupled to the heterogeneous computing platform, where the memory comprises a plurality of sets of firmware instructions, where each of the sets of firmware instructions, upon execution by a respective device among a plurality of devices of the heterogeneous computing platform, enables the respective device to provide a corresponding firmware service, and where at least one of the plurality of devices operates as an orchestrator configured to: receive context or telemetry data collected by at least one of the plurality of devices; and trigger a modification of a setting for a peripheral device based, at least in part, upon the context or telemetry data.

19 Claims, 10 Drawing Sheets

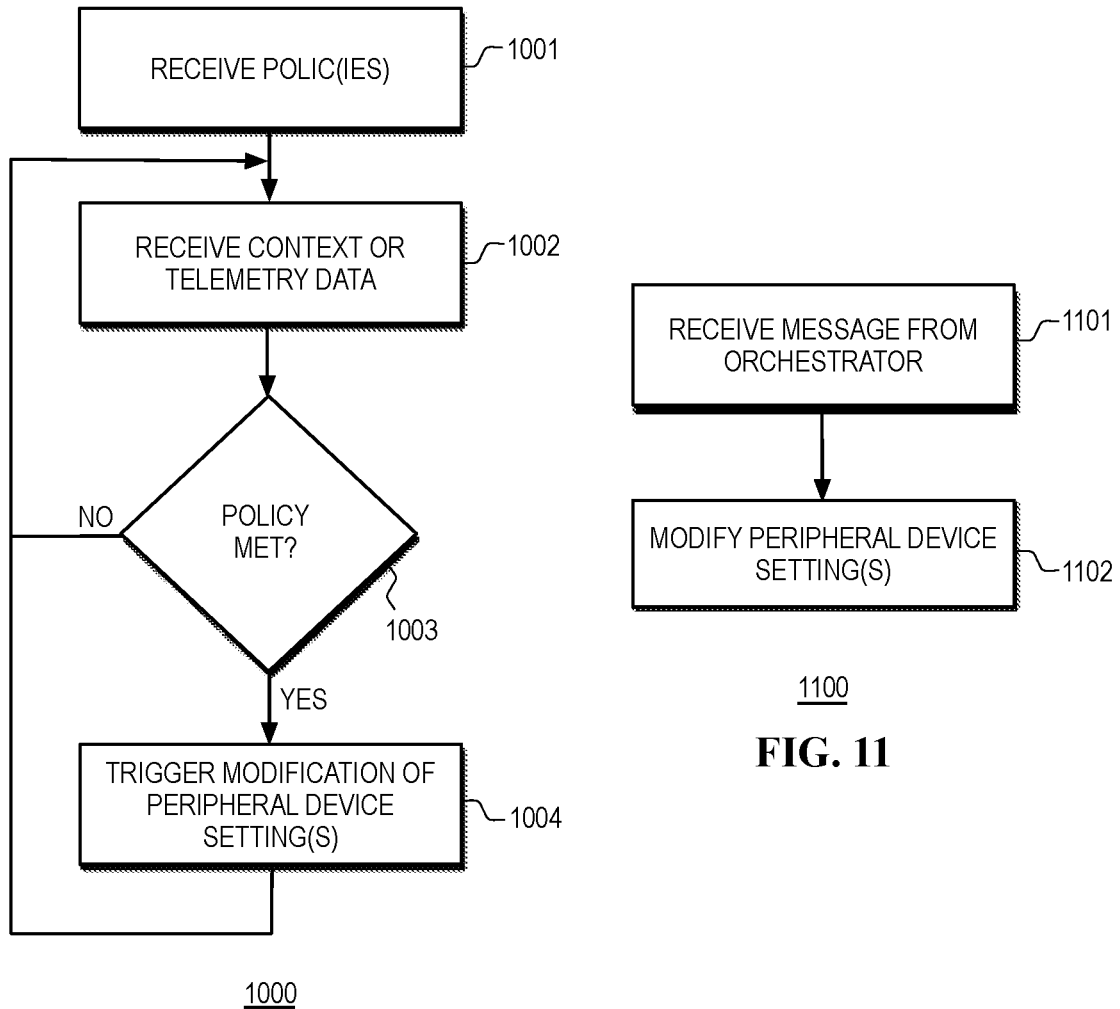

SYSTEMS AND METHODS FOR MANAGING PERIPHERAL DEVICE SETTINGS BASED UPON CONTEXT USING HETEROGENEOUS COMPUTING PLATFORMS

FIELD

This disclosure relates generally to Information Handling Systems (IHSs), and more specifically, to systems and methods for managing peripheral device settings based upon context using heterogeneous computing platforms.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had full-fledged Operating Systems (OSs) (e.g., WINDOWS, LINUX, MAC OS, etc.) executed on "x86" processors. Other types of processors, such as ARM processors, have been associated with smartphones and tablet devices, which typically carry thinner, simpler, or mobile OSs (e.g., ANDROID, IOS, WINDOWS MOBILE, etc.). In recent years, however, IHS manufacturers have started releasing desktop and laptop IHSs equipped with ARM processors, and newer OSs (e.g., WINDOWS on ARM) can now provide users with a more quintessential OS experience on those IHSs.

The inventors hereof have recognized that the IHS industry's transition from x86 to ARM-based processors has created new management, customization, optimization, interaction, servicing, and configuration opportunities for IHS users, Information Technology Decision Makers (ITDMs), and Original Equipment Manufacturers (OEMs).

SUMMARY

Systems and methods for managing peripheral device settings based upon context using heterogeneous computing platforms are described. In an illustrative, non-limiting embodiment, an Information Handling System (IHS) may include a heterogeneous computing platform and a memory coupled to the heterogeneous computing platform, where the memory comprises a plurality of sets of firmware instructions, where each of the sets of firmware instructions, upon execution by a respective device among a plurality of devices of the heterogeneous computing platform, enables the respective device to provide a corresponding firmware service, and where at least one of the plurality of devices operates as an orchestrator configured to: receive context or telemetry data collected by at least one of the plurality of devices; and trigger a modification of a setting for a peripheral device based, at least in part, upon the context or telemetry data.

For example, the heterogeneous computing platform may include at least one of: a System-On-Chip (SoC), a Field-Programmable Gate Array (FPGA), or an Application-Specific Integrated Circuit (ASIC). The orchestrator may include at least one of: a sensing hub, an Embedded Controller (EC), or a Baseboard Management Controller (BMC).

The context or telemetry data may include a metric indicative of at least one of: a core utilization, a memory utilization, a network utilization, a battery utilization, or a peripheral device utilization. Additionally, or alternatively, the context or telemetry data may include a metric indicative of at least one of: a presence of the user, an engagement of the user, an IHS location, an IHS posture, or an application in execution by the IHS. Additionally, or alternatively, the context or telemetry data may include an indication of whether a collaboration session or conference call is at least one of: (a) secure or unsecure, (b) private or public, (c) confidential or nonconfidential, or (d) privileged or non-privileged.

To trigger the modification of the peripheral device setting, the orchestrator may be configured to select an output device between a plurality of peripheral devices based, at least in part, upon the indication.

The context or telemetry data may include an indication of a time to a collaboration session or conference call. Additionally, or alternatively, the context or telemetry data may include an indication that the IHS is located in a hoteling environment or conference room.

The plurality of peripheral devices may include: an external display, an integrated display, a loudspeaker, or a headset. The setting may include a wireless connection or disconnection between the IHS and the peripheral device.

To receive the context or telemetry data, the orchestrator may be configured to receive a message from a firmware service executed by the subset of the plurality of devices via an Application Programming Interface (API) without any involvement by any host Operating System (OS). The orchestrator may also be configured to instruct a selected device among the plurality of devices to execute an Artificial Intelligence (AI) model configured to arbitrate a conflict between peripheral devices available to the IHS based, at least in part, upon the context or telemetry data.

To instruct the selected device, the orchestrator may be configured to send a message to the selected device via an API without any involvement by any host OS. To trigger the modification, the orchestrator may be configured to send a message to an EC or BMC via an API without any involvement by any host OS. To trigger the modification, EC or BMC may be configured to send a message to a peripheral device controller without any involvement by any host OS.

In some cases, the orchestrator may be configured to trigger the modification in accordance with a policy received from an Information Technology Decision Maker (ITDM) or Original Equipment Manufacturer (OEM). For example, the policy may include one or more rules that associate at least one of: (a) the peripheral device, the setting, or the modification to the setting; with (b) the context or telemetry data.

In another illustrative, non-limiting embodiment, a memory device may have a plurality of sets of firmware instructions, were each of the sets of firmware instructions is executable by a respective device among a plurality of devices of a heterogeneous computing platform in an Information Handling System (IHS) to enable the respective device to provide a corresponding firmware service, and were a given one of the plurality of sets of firmware instructions, upon execution by an EC or BMC among the plurality of devices, cause the EC or BMC to: receive context or telemetry data collected by at least one of the plurality of devices, wherein the context or telemetry data comprises at least one of: (A) an indication of whether a collaboration session or conference call is at least one of: (i) secure or unsecure, (ii) private or public, (iii) confidential or nonconfidential, or (iv) privileged or non-privileged; (B) an indication of a time to a collaboration session or conference call; or (C) an indication that the IHS is located in a hoteling environment or conference room; and trigger a modification of a setting for a peripheral device based, at least in part, upon the context or telemetry data.

In another illustrative, non-limiting embodiment, a method may include receiving, at an orchestrator of a heterogeneous computing platform in an IHS, context or telemetry data collected by at least one of a plurality of devices integrated into the heterogeneous computing platform; and triggering, by the orchestrator, a modification of a setting for a peripheral device in accordance with a policy received from an ITDM or OEM, wherein the policy comprises one or more rules that associate at least one of: (a) the peripheral device, the setting, or the modification to the setting; with (b) the context or telemetry data.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 10 and 11 are flowcharts illustrating examples of methods for managing peripheral device settings based upon context using heterogeneous computing platforms, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
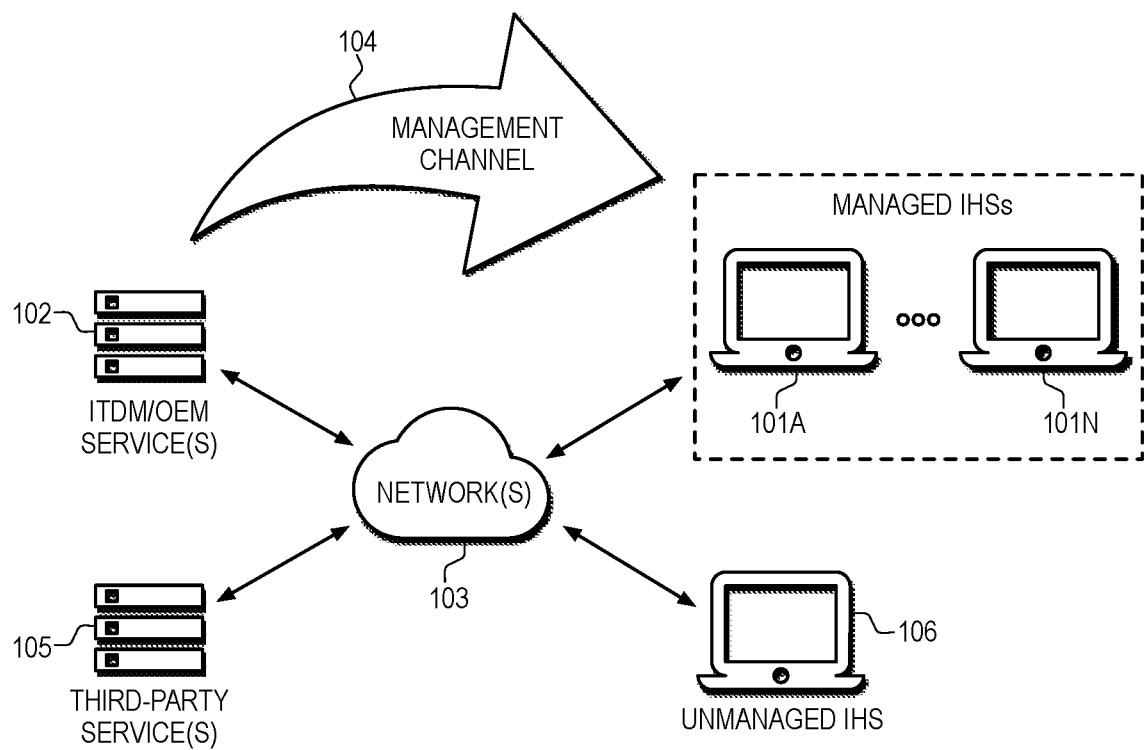
FIG. 1 is a diagram illustrating an example of an environment where systems and methods described herein may be implemented, according to some embodiments.
Figure 3:
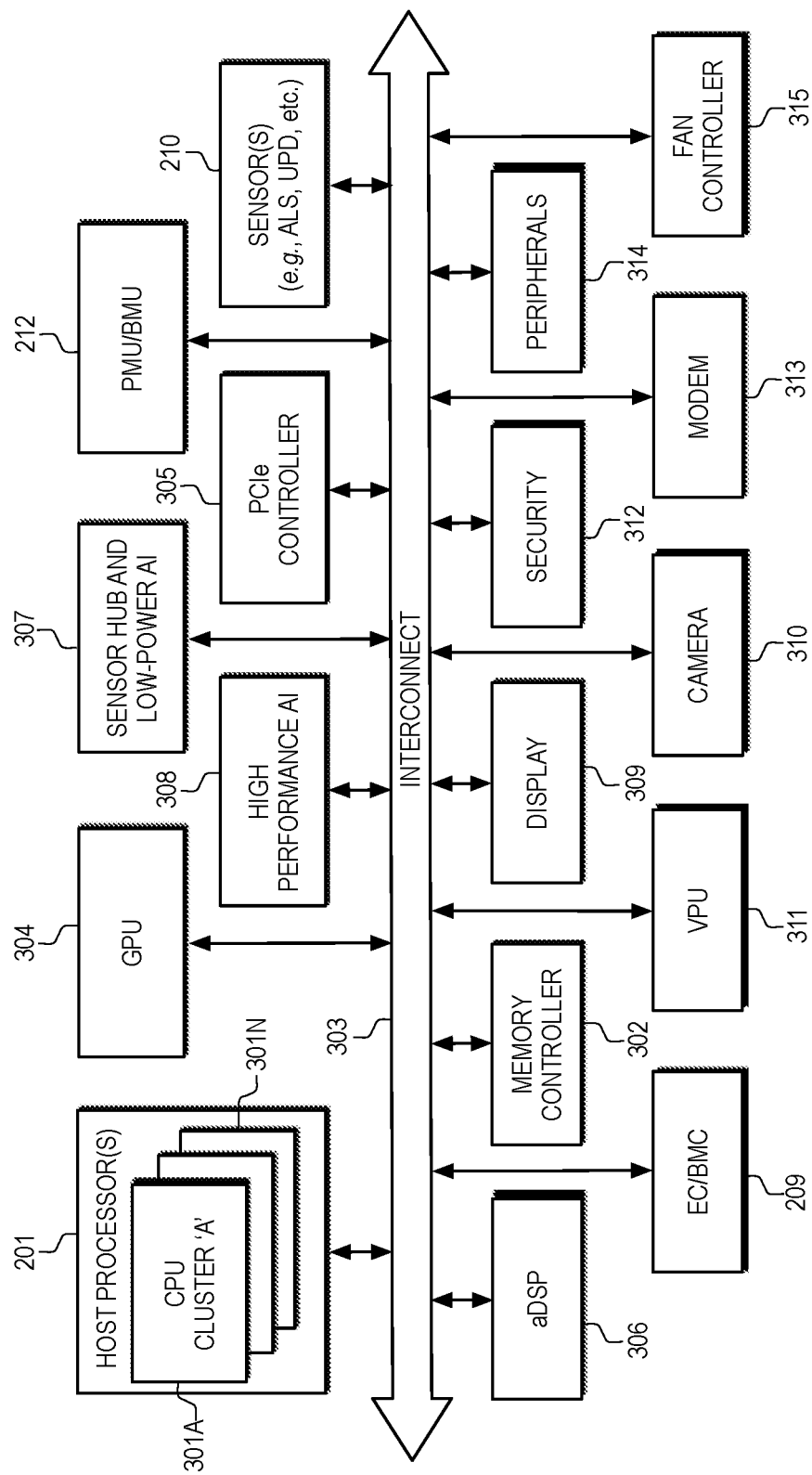
FIG. 3 is a diagram illustrating an example of a heterogeneous computing platform, according to some embodiments.

FIG. 1 is a diagram illustrating an example of environment 100 where systems and methods described herein may be implemented. In various embodiments, managed IHSs 101A-N may be accessible to Information Technology (IT) Decision Maker (ITDM) or Original Equipment Manufacturer (OEM) service(s) 102 over network(s) 103 (e.g., the Internet, an intranet, etc.) via management channel 104. Moreover, one or more of managed IHSs 101A-N may be equipped with heterogeneous computing platform 300 (FIG. 3).

The terms "heterogeneous computing platform," "heterogeneous processor," or "heterogeneous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package. Each device in the platform has different processing capabilities suitable for handling a specific type of computational task. Examples of heterogeneous processors include, but are not limited to: QUALCOMM's SNAPDRAGON, SAMSUNG's EXYNOS, APPLE's "A" SERIES, etc.

ITDM/OEM service(s) 102 may be provided on premises, along with one or more of managed IHSs 101A-N, or may be remotely located with respect to managed IHSs 101A-N. For example, one or more of managed IHSs 101A-N may be deployed within an enterprise, business, or corporation having an ITDM in charge of managing the usage, operation, servicing, configuration, and other aspects of IHSs 101A-N.

Particularly, an ITDM may use one or more management tools executed by ITDM service(s) 102 to establish management channel 104 with managed IHSs 101A-N. Examples of management tools may include, but are not limited to, WINDOWS Admin Center, MICROSOFT Endpoint Configuration Manager, System Center Configuration Manager (SCCM), AZURE, INTUNE, VMWARE WORKSPACE ONE, etc.

ITDM/OEM service(s) 102 may include an ITDM or OEM database. Such a database may include, for instance: an identification of managed IHSs 101A-N (e.g., by service tag, serial number, etc.), an inventory of IHS components installed in managed IHSs 101A-N (e.g., components integrated into managed IHSs 101A-N, peripheral devices coupled to managed IHSs 101A-N, etc.), an identification of a heterogeneous computing platform 300 installed in managed IHSs 101A-N, a list of authorized users, usernames, passwords, logon credentials, cryptographic keys, digital certificates, Operating System (OS) installation or update packages, software application installation or update packages, firmware installation or update packages, hardware policies, software policies, telemetry collected from managed IHSs 101A-N, customer/client support information, etc.

In some cases, one or more management operations performed by ITDM/OEM service(s) 102 via management channel 104 may be selected or modified, at least in part, based upon information stored in the ITDM or OEM database. For example, a different firmware installation package containing a base driver and/or extension drivers (also referred to as information or "INF" drivers) may be selected, assembled, and/or delivered to each one of managed IHSs 101A-N, specifically for that IHSs' heterogeneous computing platform.

The term "firmware," as used herein, refers to a class of program instructions that provides low-level control for a device's hardware. Generally, firmware enables basic operations of a device and/or provides hardware abstraction services to higher-level software, such as an OS. The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

Still referring to environment 100, any of managed IHSs 101A-N may be in communication with any other one of managed IHSs 101A-N and/or with another, third-party IHS 106, which is not necessarily managed by ITDM/OEM service(s) 102, over network(s) 103. Additionally, or alternatively, any of managed IHSs 101A-N may be in communication with third-party service(s) 105 (e.g., a cloud or remote service).

Examples of third-party service(s) 105 may include, but are not limited to, collaboration services (e.g., ZOOM, TEAMS, etc.), productivity services (e.g., MICROSOFT EXCHANGE servers, OFFICE 360, etc.), Artificial Intelligence or Machine Learning services (e.g., collectively referred to as "AI as a Service" or "AIaaS"), etc. In the case of AIaaS, orchestrator 501A (FIG. 6) of heterogeneous computing platform 300 (FIG. 3) within managed IHSs 101A-N may assign or offload the execution of one or more AI models, at least in part, to third-party service(s) 105 (e.g., to debug an AI model when a failure occurs, to evaluate model parameters using more powerful servers, etc.).

As used herein, the terms "Artificial Intelligence" (AI) and "Machine Learning" (ML) are used interchangeably to refer to systems, computers, or machines that mimic human intelligence to perform tasks (and to iteratively improve themselves) based on the information they collect. Generally, AI is implemented through the execution, deployment, or serving of "AI models."

The term "AI model," as used herein, generally refers to a computer-executed algorithm that emulates logical decision-making based on data. In various embodiments, AI model(s) may implement: a neural network (e.g., artificial neural network, deep neural network, convolutional neural network, recurrent neural network, transformers, autoencoders, reinforcement learning, etc.), fuzzy logic, deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), etc.

Non-limiting examples of software and libraries which may be utilized within embodiments of systems and methods described herein to perform AI modeling operations include, but are not limited to: PYTHON, OPENCV, scikit-learn, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPOT, ConvNet, ELEKTRONN, OpenNN, NEURALDESIGNER, Theano Generalized Hebbian Learning, Apache SINGA, Lightnet, and SimpleDNN.

Figure 2:
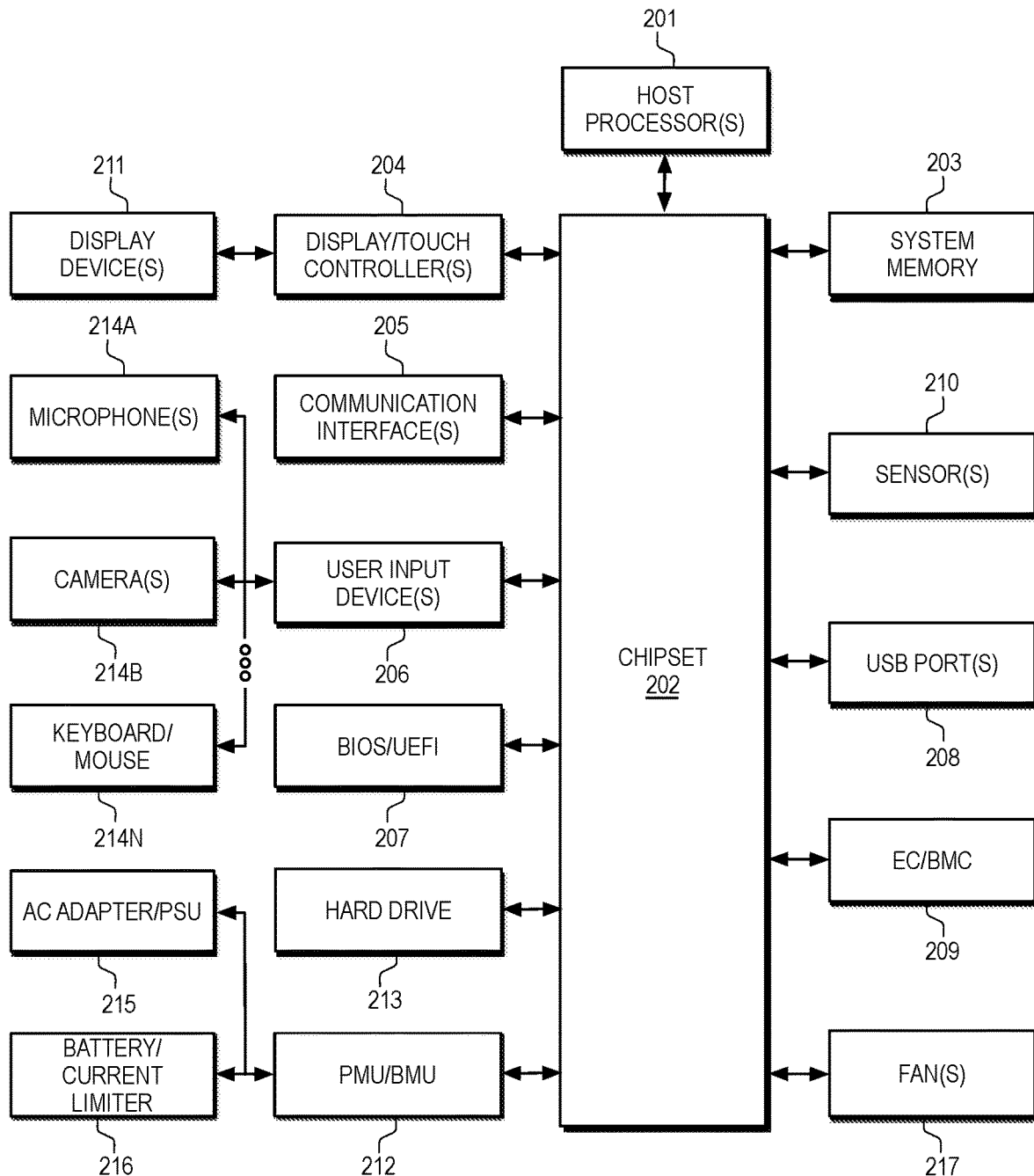
FIG. 2 is a diagram illustrating examples of components of an Information Handling System (IHS), according to some embodiments.

FIG. 2 is a block diagram of components of IHS 200, which may be used to implement any of managed IHSs 101A-N, unmanaged IHS 106, ITDM/OEM service(s) 102, and/or third-party service(s) 105 (FIG. 1).

As depicted, IHS 200 includes host processor(s) 201. In various embodiments, IHS 200 may be a single-processor system, a multi-processor system including two or more processors, and/or a heterogeneous computing platform. Host processor(s) 201 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201.

Chipset 202 may also be coupled to communication interface(s) 205 to enable communications between IHS 200 and various wired and/or wireless networks, such as Ethernet, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 205 may also be used to communicate with certain peripherals devices (e.g., BT speakers, microphones, headsets, etc.). Moreover, communication interface(s) 205 may be coupled to chipset 202 via a Peripheral Component Interconnect Express (PCIe) bus, or the like.

Chipset 202 may be coupled to display/touch controller(s) 204, which may include one or more or Graphics Processor Units (GPUs) on a graphics bus, such as an Accelerated Graphics Port (AGP) or PCIe bus. As shown, display/touch controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, or as two or more discrete displays.

Chipset 202 may provide host processor(s) 201 and/or display/touch controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide host processor(s) 201 with access to one or more Universal Serial Bus (USB) ports 208, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 213.

Chipset 202 may also provide access to one or more user input devices 206, for example, using a super I/O controller or the like. Examples of user input devices 206 include, but are not limited to, microphone(s) 214A, camera(s) 214B, and keyboard/mouse 214N. Other user input devices 206 may include a touchpad, trackpad, stylus or active pen, totem, etc.

Each of user input devices 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.).

In certain embodiments, chipset 202 may further provide an interface for communications with hardware sensors 210.

Sensors 210 may be disposed on or within the chassis of IHS 200, or otherwise coupled to IHS 200, and may include, but are not limited to: electric, magnetic, radio, optical (e.g., camera, webcam, etc.), light (e.g., Ambient Light Sensor or "ALS"), infrared, thermal (e.g., thermistors, etc.), force, pressure, acoustic (e.g., microphone), ultrasonic, proximity (e.g., User Presence Detection or "UPD" sensor, time-of-flight sensor, etc.), position, deformation, bending, direction, movement, velocity, rotation, gyroscope, Inertial Measurement Unit (IMU), acceleration sensor(s), etc.

In some cases, sensors 210 may include several sensors that enable the monitoring of the physical motion of IHS 200, such as: gravity, linear acceleration, rotation, step counter, etc. Such sensors are useful for monitoring device movement, such as tilt, shake, rotation, or swing.

Generally, movement or motion of IHS 200 reflects the physical environment in which IHS 200 is disposed. A motion sensor returns sensor values for each sensor event. For example, an accelerometer may return acceleration force data for the three coordinate axes, and a gyroscope may return rate of rotation data for three coordinate axes. Based upon data received from sensors 210, IHS 200 may determine (e.g., using an AI model) the type of motion it is being subject to and its characteristics (e.g., speed, acceleration, direction, etc.), which may then be classified, for example, as: walking, cycling, driving, flying, etc. (Other types of motion sensing mechanisms may include, but are not limited to: GPS, WWAN, WiFi, etc.)

Moreover, sensors 210 may also include one or more sensors configured to determine whether IHS 200 is stowed (or not) in a bag, backpack, or suitcase (e.g., using an ALS sensor, Radio-Frequency Identification or "RFID" sensor, etc.).

Upon booting of IHS 200, host processor(s) 201 may utilize program instructions of Basic Input/Output System (BIOS) 207 to initialize and test hardware components coupled to IHS 200 and to load host OS 400 (FIG. 4) for use by IHS 200. BIOS 207 provides an abstraction layer that allows host OS 400 to interface with certain IHS components 200. Relying upon the hardware abstraction layer provided by BIOS 207, software stored in system memory 203 and executed by host processor(s) 201 can interface with certain I/O devices that are coupled to IHS 200.

The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and handles various tasks not ordinarily handled by host processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, power, wireless LAN, sleep, etc.), managing PMU/BMU 212, alternating current (AC) adapter/Power Supply Unit (PSU) 215 and/or battery/current limiter 216, allowing remote diagnostics and remediation over network(s) 103, etc.

For example, EC/BMC 209 may implement operations for interfacing with power adapter/PSU 215 in managing power for IHS 200. Such operations may be performed to determine the power status of IHS 200, such as whether IHS 200 is operating from AC adapter/PSU 215 and/or battery 216.

Firmware instructions utilized by EC/BMC 209 may also be used to provide various core operations of IHS 200, such as power management and management of certain modes of IHS 200 (e.g., turbo modes, maximum operating clock frequencies of certain components, etc.).

In addition, EC/BMC 209 may implement operations for detecting certain changes to the physical configuration or posture of IHS 200. For instance, when IHS 200 as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, stand, tablet, tent, or book. For example, when display(s) 211 of IHS 200 is open with respect to a horizontal keyboard portion, and the keyboard is facing up, EC/BMC 209 may determine IHS 200 to be in a laptop posture. When display(s) 211 of IHS 200 is open with respect to the horizontal keyboard portion, but the keyboard is facing down (e.g., its keys are against the top surface of a table), EC/BMC 209 may determine IHS 200 to be in a stand posture.

When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in a book posture. When IHS 200 has two displays open to form a triangular structure sitting on a horizontal surface, such that a hinge between the displays is at the top vertex of the triangle, EC/BMC 209 may determine IHS 200 to be in a tent posture.

In some cases, as part of its determinations, EC/BMC 209 may also detect if IHS 200 (or display 211) is in a landscape or portrait orientation (e.g., using accelerometer 210, etc.).

In some implementations, EC/BMC 209 may be installed as a Trusted Execution Environment (TEE) component to the motherboard of IHS 200, and it may include a secure memory to store hashes, signatures, certificates, keys, etc. The secure memory may employ hardware-based encryption that isolates specific data from other data in a private region or enclave, protected from processes running at higher privilege levels. In some cases, the secure memory within EC/BMC 209 may be used to at least temporarily store images captured or recorded in response to Onlooker Detection events discussed in more detail below.

Additionally, or alternatively, EC/BMC 209 may be configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component may compare it against the reference hash value to determine if any modifications have been made to the component, thus indicating that the component has been compromised. In this manner, EC/BMC 209 may validate the integrity of hardware and software components installed in IHS 200.

In various embodiments, IHS 200 may be coupled to an external power source (e.g., AC outlet or mains) through an AC adapter/PSU 215. AC adapter/PSU 215 may include an adapter portion having a central unit (e.g., a power brick, wall charger, or the like) configured to draw power from an AC outlet via a first electrical cord, convert the AC power to direct current (DC) power, and provide DC power to IHS 200 via a second electrical cord.

Additionally, or alternatively, AC adapter/PSU 215 may include an internal or external power supply portion (e.g., a switching power supply, etc.) connected to the second electrical cord and configured to convert AC to DC. AC adapter/PSU 215 may also supply a standby voltage, so that most of IHS 200 can be powered off after preparing for hibernation or shutdown, and powered back on by a "wake-up" or "wake" event (e.g., remotely via wake-on-LAN, etc.). In general, AC adapter/PSU 215 may have any specific power rating, measured in volts or watts, and any suitable connectors.

IHS 200 may also include internal or external battery 216. Battery 216 may include, for example, a Lithium-ion or Li-ion rechargeable device capable of storing energy sufficient to power IHS 200 for an amount of time, depending upon the IHS's workloads, environmental conditions, etc. In some cases, a battery pack may also contain temperature sensors, voltage regulator circuits, voltage taps, and/or charge-state monitors. For example, battery 216 may include a current limiter, or the like.

In some embodiments, battery 216 may be configured to detect overcurrent or undervoltage conditions using Limits Management Hardware (LMH). As used herein, the term "overcurrent" refers to a condition in an electrical circuit that arises when a normal load current is exceeded (e.g., overloads, short circuits, etc.). Conversely, the term "undervoltage" refers to a condition (e.g., "brownout") where the applied voltage drops to X % of rated voltage (e.g., 90%), or less, for a predetermined amount of time (e.g., 1 minute).

Power Management Unit (PMU) 212 governs power functions of IHS 200, including AC adapter/PSU 215 and battery 216. For example, PMU 212 may be configured to: monitor power connections and battery charges, charging batteries, control power to other components, devices, or ICs, shut down components when they are left idle, control sleep and power functions (On and Off), managing interfaces for built-in keypad and touchpads, regulate real-time clocks (RTCs), etc.

In some implementations, PMU 212 may include one or more Power Management Integrated Circuits (PMICs) configured to control the flow and direction or electrical power in IHS 200. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 212 may include a Battery Management Unit (BMU) (referred to collectively as "PMU/BMU 212"). AC adapter/PSU 215 may be removably coupled to a battery charge controller within PMU/BMU 212 to provide IHS 200 with a source of DC power from battery cells within battery 216 (e.g., a lithium ion (Li-ion) or nickel metal hydride (NiMH) battery pack including one or more rechargeable batteries). PMU/BMU 212 may include non-volatile memory and it may be configured to collect and store battery status, charging, and discharging information, and to provide that information to other IHS components, such as, for example devices within heterogeneous computing platform 300 (FIG. 3).

Examples of information collected and stored in a memory within PMU/BMU 212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 212. Power draw data may also be monitored with respect to individual components or devices of IHS 200. Whenever applicable, PMU/BMU 212 may administer the execution of a power policy, or the like.

IHS 200 may also include one or more fans 217 configured to cool down one or more components or devices of IHS 200 disposed inside a chassis, case, or housing. Fan(s) 217 may include any fan inside, or attached to, IHS 200 and used for active cooling. Fan(s) 217 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 200 may not include all the components shown in FIG. 2. In other embodiments, IHS 200 may include other components in addition to those that are shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components of IHS 200 (e.g., chipset 202, display/touch controller(s) 204, communication interface(s) 205, EC/BMC 209, etc.) may be replaced by discrete devices within heterogeneous computing platform 300 (FIG. 3). As such, IHS 200 may assume different form factors including, but not limited to: servers, workstations, desktops, laptops, appliances, video game consoles, tablets, smartphones, etc.

FIG. 3 is a diagram illustrating an example of heterogeneous computing platform 300. In various embodiments, platform 300 may be implemented in an SoC, FPGA, ASIC, or the like. Platform 300 includes a plurality of discrete or segregated devices 301-315, each device having a different set of processing capabilities suitable for handling a particular type of computational task. When each device 301-315 in platform 300 executes only the types of computational tasks it was specifically designed to execute, the overall power consumption of platform 300 is made more efficient.

In various implementations, each device 301-315 in platform 300 may include its own microcontroller(s) or core(s) (e.g., ARM core(s)) and corresponding firmware. In some cases, a device in platform 300 may also include its own hardware-embedded accelerator (e.g., a secondary or co-processing core coupled to a main core).

Each device 301-315 in platform 300 may be accessible through a respective Application Programming Interface (API). Additionally, or alternatively, each device in platform 300 may execute its own OS. Additionally, or alternatively, one or more of devices in platform 300 may be a virtual device.

In certain embodiments, at least one device 301-315 in platform 300 may have updatable firmware which, upon installation, operates to change the performance, available features, settings, configuration options, API, drivers, and/or services provided by that device. For example, each update may be delivered to platform 300 as a system-wide firmware installation package having a plurality of firmware components, and each firmware component may be distributed to its respective device 301-315 (or corresponding memory space).

In some implementations, the latest system-wide firmware installation package received by platform 300 may be installed at every boot of IHS 200.

In the example of FIG. 3, platform 300 includes CPU clusters 301A-N as an implementation of host processor(s) 201 intended to perform general-purpose computing operations. Each of CPU clusters 301A-N may include a plurality or processing cores and a cache memory. In operation, CPU clusters 301A-N may be made available and accessible to host OS 400, optimization/customization application(s) 412, OS agent(s) 413, and/or other application(s) 414 (FIG. 4) executed by IHS 200.

CPU clusters 301A-N are coupled to memory controller 302 via main bus or interconnect 303. Memory controller 302 is responsible for managing memory accesses for all of devices connected to interconnect 303, which may include any communication bus suitable for inter-device communications within an SoC (e.g., Advanced Microcontroller Bus Architecture or "AMBA," QPI, HyperTransport or "HT," etc.). All devices coupled to interconnect 303 can communicate with each other and with a host OS executed by CPU clusters 301A-N through interconnect 303.

GPU 304 is a device designed to produce graphical or visual content and to communicate that content to a monitor or display, where the content may be rendered.

PCIe controller or root complex 305 provides an entry point into any additional devices external to platform 300 that have a respective PCIe interface (e.g., graphics cards, USB controllers, etc.).

Audio Digital Signal Processor (aDSP) 306 is a device designed to perform audio and speech operations and to perform in-line enhancements for audio input(s) and output(s). Examples of audio and speech operations may include, but are not limited to: noise reduction, echo cancellation, directional audio detection, wake word detection, muting and volume controls, filters and effects, etc.

In operation, input and/or output audio streams may pass through and be processed by aDSP 306, which can send the processed audio to other devices 301-315 on interconnect 303 (e.g., CPU clusters 301A-N). aDSP 306 may also be configured to process one or more of platform 300's sensor signals (e.g., gyroscope, accelerometer, pressure, temperature, etc.), low-power vision or camera streams (e.g., for user presence detection, Onlooker Detection, etc.), or battery data (e.g., to calculate a charge or discharge rate, current charge level, etc.). To that end, aDSP 306 may be coupled to BMU 212.

In some cases, aDSP 306 may execute a firmware service configured to: retrieve raw battery data from PMU/BMU 212, preprocess the raw data, and prepare features or attributes (e.g., select, reduce, concatenate, group, etc.) for subsequent processing. Furthermore, to change a PMU/BMU 212 setting, aDSP 306 may communicate with EC/BMC 209 and/or PMU/BMU 212 to request a change to that setting. Examples of PMU/BMU 212 settings may include, but are not limited to: a charge rate 'C' (e.g., 0.5 C for slow charges, 0.3 C for trickle charging, 2.5 C for fast charging, etc.), a sustained or average peak power (SPP) parameter, a maximum peak power (MPP) parameter, a maximum charge current (MCC) parameter, etc.

Sensor hub and low-power AI device 307 is a very low power, always-on device designed to consolidate information received from other devices in platform 300, process any context and/or telemetry data streams, and provide that information to: (i) host OS 400, (ii) applications 412-414, and/or (iii) other devices 301-306 and/or 308-315 in platform 300. For example, sensor hub and low-power AI device 307 may include general-purpose input/output (GPIOs) that provide Inter-Integrated Circuit (I2C), Serial Peripheral Interface (SPI), and/or serial interfaces to receive data from sensors (e.g., sensors 210, camera 310, peripheral controller(s) 314, etc.).

Figure 6:
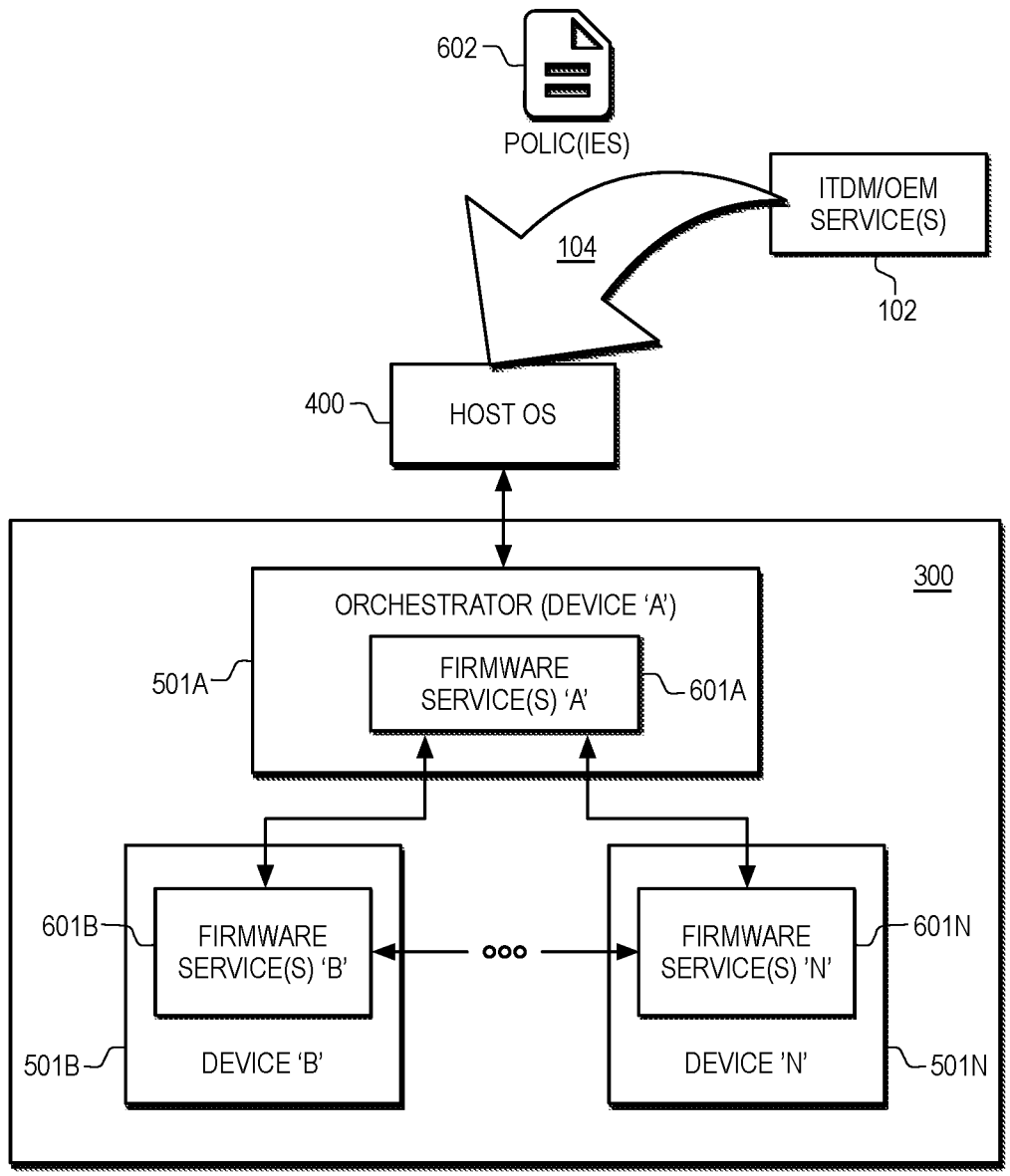
FIG. 6 is a diagram illustrating an example of an orchestration system where an orchestrator device is configured to manage other devices in a heterogeneous computing platform, according to some embodiments.

Still referring to FIG. 3, sensor hub and low-power AI device 307 may include an always-on, low-power core configured to execute small neural networks and specific applications, such as contextual awareness and other enhancements. In some embodiments, sensor hub and low-power AI device 307 may be configured to operate as orchestrator 501A (FIG. 6).

High-performance AI device 308 is a significantly more powerful processing device than sensor hub and low-power AI device 307, and it may be designed to execute multiple complex AI algorithms and models concurrently (e.g., Natural Language Processing, speech recognition, speech-to-text transcription, video processing, gesture recognition, user engagement determinations, etc.).

For example, high-performance AI device 308 may include a Neural Processing Unit (NPU), Tensor Processing Unit (TSU), Neural Network Processor (NNP), or Intelligence Processing Unit (IPU), and it may be designed specifically for AI and Machine Learning (ML), which speeds up the processing of AI/ML tasks while also freeing host processor 201 to perform other tasks.

Display/graphics device or controller 309 may be designed specifically to perform video enhancement operations. In operation, display/graphics device 309 may provide a video signal to an external display coupled to IHS 200 (e.g., display device(s) 211).

Camera device or controller 310 includes an Image Signal Processor (ISP) configured to receive and process video frames captured by a camera coupled to platform 300 (e.g., in the visible and/or infrared spectrum).

Video Processing Unit (VPU) 311 is a device designed to perform hardware video encoding and decoding operations, thus accelerating the operation of camera 310 and display/graphics device 309. For example, VPU 311 may be configured to provide optimized communications with camera device 310 for performance improvements.

In some cases, devices 309-311 may be coupled to interconnect 303 via a secondary interconnect. A secondary interconnect may include any bus suitable for inter-device and/or inter-bus communications within an SoC.

Security device or controller 312 includes any suitable security device, such as a dedicated security processor, a Trusted Platform Module (TPM), a TRUSTZONE device, a PLUTON processor, or the like. In various implementations, security device 312 may be used to perform cryptography operations (e.g., generation of key pairs, validation of digital certificates, etc.) and/or it may serve as a hardware root-of-trust (ROT) for heterogeneous computing platform 300 and/or IHS 200.

Wireless controller, network adapter, and/or modem 313 is a device designed to enable all wired and wireless communications in any suitable frequency band (e.g., BT, WiFi, 5G, etc.), subject to AI-powered optimizations/customizations for improved speeds, reliability, and/or coverage.

Peripheral controller(s) 314 may include all other devices coupled to platform 300 through mechanisms other than PCIe controller 305 (e.g., Thunderbolt, USB, DisplayPort, etc.). In some cases, peripheral controller(s) 314 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 200, through which various peripheral device settings may be modified.

In some cases, devices 312 and/or 313 may be coupled to interconnect 303 via the same secondary interconnect serving devices 309-311. Additionally, or alternatively, devices 312 and/or 313 may be coupled to interconnect 303 via another secondary interconnect.

EC/BMC 209 is designed to enable management operations of IHS 200, similarly as described with respect to FIG. 2, but here integrated into platform 300, as another SoC device. Unlike other devices in platform 300, however, EC/BMC 209 may be operational from the very start of each SoC power reset, before other devices such as CPU clusters 301A-N or sensor hub and low-power AI device 307 are fully running or powered on.

EC/BMC 209 may also integrate or otherwise be coupled to one or more controllers configured to cooperate certain peripheral devices, such as lighting devices, or the like. Examples of lighting devices may include, but are not limited to, displays, keyboards, Touch Function Rows (TFRs) or "touch bars" (touch-based display bars that replace the row of function keys on a keyboard), touch pads (TPs), trackpads, totems, mice, or any other illuminated device (e.g., via a backlight). In this implementation, EC/BMC 209 is coupled to keyboard (KB) controller 316, TFR controller 317, and TP controller 318. In other implementation, however, at least one of controllers 316-318 may be integrated into EC/BMC 209. Moreover, EC/BMC 209 is configured to issue command to controllers 316-318 to control aspects of their respective devices' backlights (e.g., on/off, brightness, color, etc.) and other operations.

EC/BMC 209 may also provide an out-of-band (OOB) channel that serves as management channel 104 of FIG. 1. In some cases, EC/BMC 209 may be external to SoC platform 300 and coupled thereto via a high-speed interface (e.g., enhanced SPI or "eSPI"). In other cases, EC/BMC 209 may be configured to operate as orchestrator 501A (FIG. 6).

In various implementations, fan controller 315 may be used to operate fan(s) 217. For example, fan controller 315 may be provided to regulate the speed of the fan(s) 217.

Fan controller 315 may receive periodic sensor readings from one or more sensors of the chassis 104 and dynamically adjust the speed of fan(s) 217 using a proportional-integral-derivative (PID) controller algorithm that is fed with sensor data such as, for example: outlet ambient temperature, CPU temperature, Dual In-line Memory Module or "DIMM" temperature, IHS power consumption, etc.

In case of sensor or fan controller failure, fan(s) 217 may be configured to operate at their maximum speed. Additionally, or alternatively, EC/BMC 209 or other platform device (e.g., sensor hub and low-power AI device 307) may send control signals to fan controller 315 to operate fan(s) 217.

In various embodiments, one or more devices of heterogeneous computing platform 300 (e.g., GPU 304, aDSP 306, sensor hub and low-power AI device 307, high-performance AI device 308, VPU 311, etc.) may be configured to execute one or more AI model(s), simulation(s), and/or inference(s).

Figure 4:
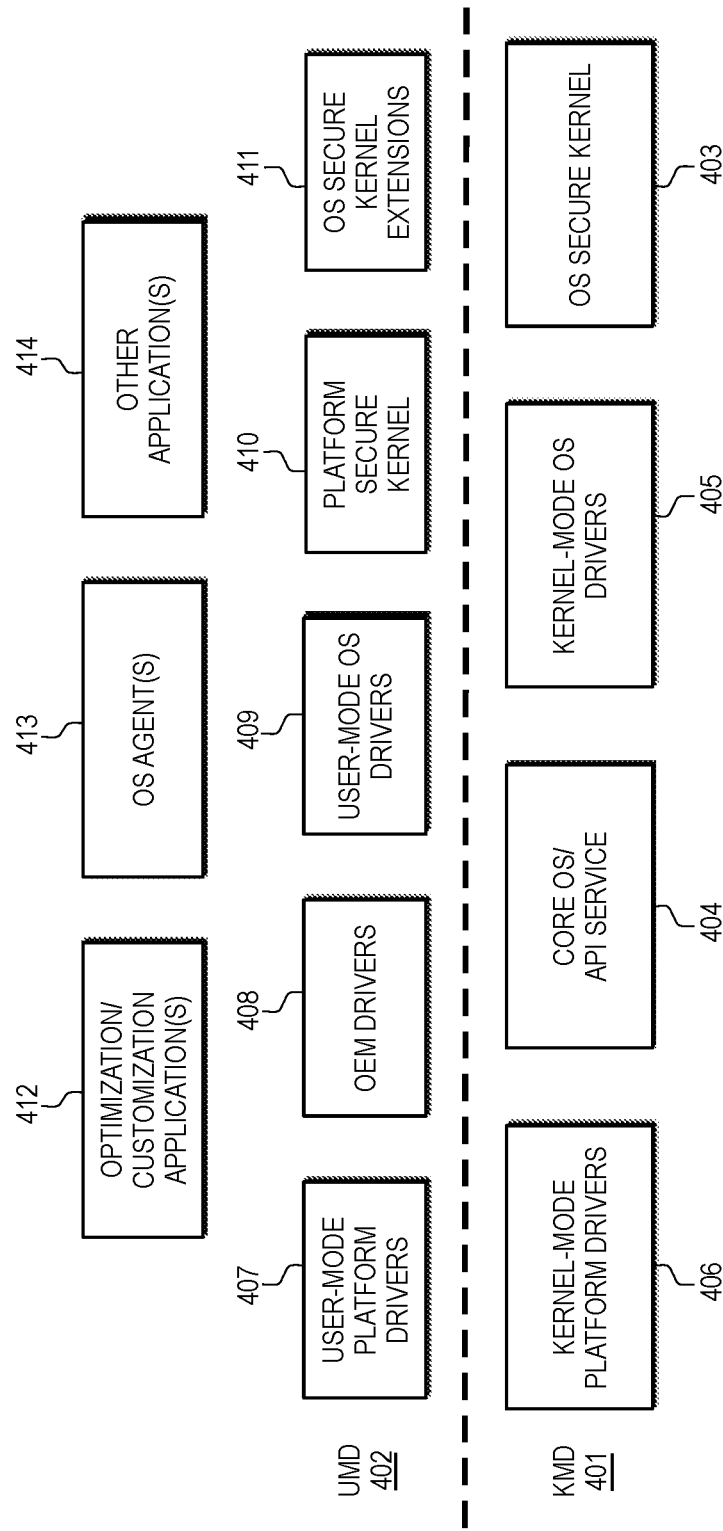
FIG. 4 is a diagram illustrating an example of a host Operating System (OS) executable by a heterogeneous computing platform, according to some embodiments.

FIG. 4 is a diagram illustrating an example of host OS 400 executable by CPU clusters 301A-N of heterogeneous computing platform 300. In some cases, host OS 400 may be implemented as WINDOWS on ARM. As shown, the stack of host OS 400 includes kernel mode drivers (KMD) in kernel space 401 below and user mode drivers (UMD) in user space 402 above.

In kernel space 401, OS secure kernel 403 is responsible for secure operations (e.g., encryption, validation, etc.) within IHS 200. Core OS/API service 404 has direct access to processing component(s) of IHS 200 such as, for example, heterogeneous computing platform 300. OS drivers 405 include kernel mode drivers developed by the OS publisher or other developer. Platform drivers 406 include kernel mode drivers developed by the manufacturer of heterogeneous computing platform 300, for example, for use with devices 301-315.

In user space 402, user-mode platform drivers and services 407 enable access to features provided by devices 301-315 through kernel-mode platform drivers 406. OEM drivers 408 enable features in OEM devices coupled to IHS 200, and user-mode OS drivers and services 409 enable access to OS features through kernel mode OS drivers 405. Platform secure kernel 410 includes protected user-mode portions of host OS 400 developed by the manufacturer of heterogeneous computing platform 300, and OS secure kernel extensions 411 include extensions to protected user-mode portions of host OS 400 developed by the OS publisher or other developer.

Applications 412-414 (and/or host OS 400 components) may use AI models executed by devices within platform 300 for various reasons, ranging from video/audio processing to system optimization tasks. Additionally, or alternatively, ITDMs/OEMs may direct a selected device within platform 300 to act as orchestrator 501A (FIG. 6) and to execute AI models that enable various IHS management or configuration operations.

Particularly, OS agent(s) 413 may include an OS agent or client configured to communicate with service(s) provided by ITDM/OEM server 102 to establish management channel 104. Moreover, other application(s) 414 may include or be a part of any workload executable by heterogeneous computing platform 300. For example, other application(s) 414 may include productivity, collaboration, streaming, multimedia, or gaming applications executable by host OS 400.

Optimization/customization application(s) 412 may include any host OS 400-level application configured to intelligently optimize the performance of IHS 200 (e.g., DELL OPTIMIZER), for example, by using AI models to dynamically configure IHS 200's settings and/or to optimize the performance of other applications 414. In operation, optimization/customization application(s) 412 may improve the productivity, performance, and user experience through system usage analysis and learning. For example, optimization/customization application(s) 412 may be invoked, within host OS 400, to learn how a selected application 414 is used. Optimization/customization application(s) 412 may identify optimization opportunities, classify users, and automatically apply appropriate settings (e.g., storage, memory, and/or CPU) to improve a selected application 414's performance.

At least one of applications 412-414 may be configured to utilize one or more devices, features, or services exposed, surfaced, enumerated, or otherwise made available by user-mode drivers 407-409, for example, through a Human Interface Device (HID) interface and/or an HID report provided by host OS 400, or the like. In some cases, one or more of applications 412-414 may operate as orchestrator 501A (FIG. 6).

In various implementations, host OS 400 may be configured to receive a firmware installation package or executable file containing at least one extension driver (e.g., a setup information or "INF" text file in a driver package) from ITDM/OEM service(s) 102 via management channel 104. The installation package may be processed by a UEFI UpdateCapsule process when distributed as part of an OS update, as a system-wide and/or device-specific firmware update, and/or it may be distributed by OEM update applications such as DELL COMMAND UPDATE, integrated with remote deployment and update management tools.

Firmware components of each extension driver may be loaded, attached, or extended onto user-mode platform drivers and services 407, and may be communicated by user-mode platform drivers and services 407 to respective devices of heterogeneous computing platform 300 through kernel-mode platform drivers 406 for installation, update, or execution of such firmware components in those devices.

As such, the deployment of extension drivers by host OS 400 as OEM drivers 408 provides value-added features or services to user-mode platform drivers (e.g., base drivers) 407 and/or applications 412-414. Particularly, OEM drivers 408 may expose custom services and routines provided by any one of devices 301-315 upon execution of their corresponding firmware components. In some cases, OEM driver 408 may also operate as orchestrator 501A (FIG. 6).

Figure 5:
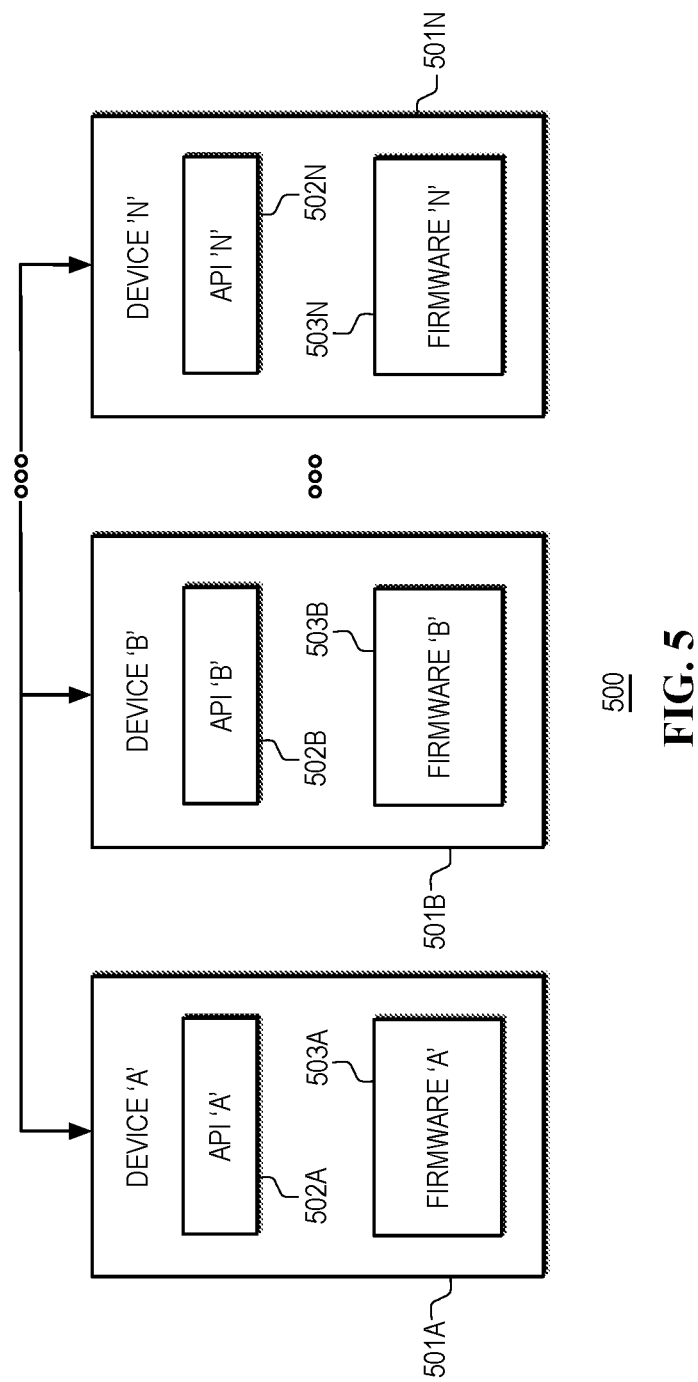
FIG. 5 is a diagram illustrating an example of host OS-independent, autonomous inter-device communications in a heterogeneous computing platform, according to some embodiments.

FIG. 5 is a diagram illustrating an example of host OS-independent, autonomous inter-device communications 500 in heterogeneous computing platform 300. Particularly, each of devices 501A-N may implement any of devices 301-315 of heterogeneous computing platform 300.

Each of APIs 502A-N provides access to firmware 503A-N executed by a corresponding device 501A-N. In operation, each firmware component 503A-N may exchange data and commands directly with each other using APIs 502A-N. Through APIs 502A-N, one or more of devices 501A-N may be configured to enable, disable, or modify firmware services provided by other devices 503A-N. For example, in some embodiments, one or more of devices 501A-N may be designated as orchestrator 501A (FIG. 6) upon booting of platform 300.

In various embodiments, firmware services resulting from the execution of firmware 503A-N may be provided by their respective device 501A-N to other devices 501A-N within heterogeneous computing platform 300 autonomously and/or independently of the operation of host OS 400. Communications between executing firmware 503A-N and applications 412-414 may take place through OEM drivers 408. In some cases, executing firmware 503A-N may be identified by or exposed to host OS 400 and/or applications 412-414 as part of HID reports.

Firmware service(s) 601A-N and/or corresponding OEM drivers 408 may be installed, modified, updated, and/or removed from IHS 200 upon each installation of a firmware installation package for the entire heterogeneous computing platform 300, for example, at each boot of IHS 200. For example, each firmware component 503A-N providing a respective firmware service(s) 601A-N may be delivered to a respective device 501A-N as an extension driver.

Upon execution, firmware service(s) 601A-N may provide additional controls over the management, deployment, customization, and/or configuration of IHS 200 to the ITDM or OEM that are independent of updates to host OS 400 and/or applications 412-414.

In other embodiments, any given one of devices 501A-N may be rebooted or reset independently of the other devices to perform a local installation, update, or modification of that given device's firmware service(s) 601A-N without having to reboot the entire heterogeneous computing platform 300 and/or IHS 200. Additionally, or alternatively, one or more of devices 501A-N may have its firmware service(s) 601A-N at least partially installed or updated without rebooting or resetting the device.

FIG. 6 is a diagram illustrating an example of orchestration system 600 where orchestrator 501A (e.g., any of devices 301-315 assigned to operate as such) is configured to manage other devices 501B-N (e.g., other devices 301-315) of heterogeneous computing platform 300 of IHS 200. In some embodiments, orchestrator 501A may be implemented as one of applications 412-414, one of OEM drivers 408, sensor hub and low-power AI device 307 and/or its firmware service(s), EC/BMC 209 and/or its firmware service(s), or any combination thereof.

Orchestrator 501A may be configured to provide firmware service(s) 601A through the execution of firmware 503A. Similarly, each of devices 501B-N may be configured to provide their own firmware service(s) 601B-N through the execution of firmware 503B-N. Moreover, each of firmware service(s) 601A-N may operate independently of host OS 400.

Firmware service(s) 601A of orchestrator 501A may be configured to facilitate the communication of data, commands, AI models, scripts, and/or routines among firmware service(s) 601B-N of devices 601B-N via APIs 502B-N. Additionally, or alternatively, firmware service(s) 601B-N may exchange data and commands with each other using APIs 502B-N.

For example, in some cases orchestrator 501A may be implemented by sensor hub and low-power AI device 307 and/or by EC/BMC 209. GPU 304 may execute firmware service(s) 601B, high-performance AI device 308 may execute firmware service(s) 601C, aDSP 306 may execute firmware service(s) 601D, display 309 may execute firmware service(s) 601E, and other devices 501F-N (e.g., modem 313, peripherals 314, etc.) may execute respective ones of firmware service(s) 601F-N. Firmware service(s) 601A-N may be performed through the execution of firmware components 503A-N previously distributed as extension drivers in a heterogeneous computing platform 300-wide firmware installation package.

Orchestrator 501A may be configured to operate a plurality of devices 501B-N and to receive context and/or telemetry data therefrom. In this manner, orchestrator 501A may be configured to enable IHS users, ITDMs, and/or OEMs to manage, deploy, customize, and/or configure IHS 200 and/or applications 412-414, for example, based upon contextual and/or telemetry-based rules.

As used herein, the terms "context data" or "contextual data" refer broadly to any relevant, background information that can provide a broader understanding of an entity or event. Generally, context data may come from various sources, and it may be used to provide insights into an IHS's operation and/or of a user's behavior patterns, thereby improving their experience.

Examples of context data accessible by orchestrator 501A (FIG. 6) may include, but are not limited to: a type of audio environment indicative of the types of sounds being produced near a user of IHS 200 (e.g., indoors, outdoors, home, office, restaurant, car, airport, airplane, etc.), gyroscope data (e.g., an indication of an angular velocity, for example, in mV/deg/s), accelerometer data (e.g., an indication of a linear acceleration, for example, in mV/g), a Global Positioning System (GPS) or wireless network location data, Red-Green-Blue (RGB) image or camera data, infrared (IR) image or camera data, eye-gaze direction data, audio data, IHS posture data, a time-of-day/week/month/year, calendar event data, a role of the user (e.g., as an employee in an enterprise, as a participant of a collaboration session, etc.), a language of the user, data related to software applications in execution by IHS 200 (e.g., number of windows open, number of minimized windows, identity or type of applications 412-414 in execution, number of applications 412-414 in execution, etc.), financial/economic data, news, weather, traffic, social media activity, purchasing data, shipping or delivery data, etc.

For instance, context data may be used to identify presence hint(s) and/or user engagement cue(s). As used herein, the term "presence hints" refers to any information usable to characterize whether a user is present or absent before IHS 200 and/or a distance between the user of IHS 200. For example, presence hints may include (or be derived from) data received from presence or proximity sensors 210, camera 310, peripheral controller(s) 314 (e.g., whether the user is typing at a keyboard or moving a mouse), etc.

The term "user engagement cue" refers to any user's action, such as utterances, movements, stances, gestures (e.g., fingers, hand, arm, head, body, etc.), or other behavior indicative of whether and/or to what degree a user is engaged with aspects of IHS 200 and/or applications 412-414.

In various implementations, to identify a user engagement cue, one or more devices in heterogeneous computing platform 300 may be configured to perform speech and/or gesture recognition operations based on audio and/or video data streams captured with microphone(s) 214A and/or camera(s) 214B. Moreover, to determine a level of engagement of a user, orchestrator 501A may keep track of one or more engagement cues and calculate an engagement score based upon the number, frequency of occurrence, and/or weight of the detected cue(s).

The term "telemetry data," as used herein, refers to information resulting from in situ collection of measurements or other data by devices 301-315, or any other IHS device or component, and its transmission (e.g., automatically) to a receiving entity, such as orchestrator 501A (FIG. 6), for example, for monitoring purposes. Typically, telemetry data may include, but is not limited to, measurements, metrics, and/or values which may be indicative of: core utilization, memory utilization, network quality and utilization, battery utilization, peripheral or I/O device utilization, etc.

For instance, telemetry data may include, but is not limited to, measurements, metrics, logs, or other information related to: current or average utilization of devices 301-315 or other IHS components, CPU/core loads, instant or average power consumption of devices 301-315 or other IHS components, instant or average memory usage by devices 301-315 or other IHS components, characteristics of a network or radio system (e.g., WiFi vs. 5G, bandwidth, latency, errors, etc.), keyboard, mice, trackpad, or trackball usage data, transaction times, latencies, response codes, errors, data collected from sensors 210, etc.

It should be noted that, in some implementations, there may be overlap between context data and telemetry data and/or sources. In other implementations, however, context data, telemetry data, and/or their respective sources may be distinct from each other.

In various embodiments, systems and methods described herein may enable an ITDM or OEM to manage, deploy, customize, and/or configure aspects of IHS 200 through orchestrator 501A based, at least in part, upon context and/or telemetry data. For example, ITDM/OEM service(s) 102 may provide one or more devices 501A-N with firmware components 503A-N that, upon execution by their respective devices, add, remove, or modify services accessible to one or more application(s) 412-414 based upon the context and/or telemetry data.

Particularly, orchestrator 501A may receive message(s), file(s), command(s), script(s), and/or ITDM/OEM management polic(ies) 602 (e.g., an Extensible Markup Language or "XML", a JavaScript Object Notation or "JSON" file, etc.) from ITDM/OEM service(s) 102 via OS agent(s) 413 (i.e., in-band).

When management channel 104 is an OOB channel between EC/BMC 209 and ITDM/OEM service(s) 102, OS agent(s) 413 may be replaced with EC/BMC 209.

In some cases, along with polic(ies) 602, OS agent(s) 413 may also receive one or more AI models and/or AI model parameters for use by a device within platform 300, such as high-performance AI device 308 and/or sensor hub and low-power AI device 307. AI models and/or parameters may be provided to OS agent(s) 413 by ITDM/OEM service(s) 102 or by third-party service(s) 105.

Polic(ies) 602 may contain commands, program instructions, routines, and/or rules that conform to APIs 502A-N. Alternatively, or alternatively, orchestrator 501A may interpret polic(ies) 602 and issue commands conforming to APIs 502A-N. Using APIs 502B-N, orchestrator 501A may be configured to enable, disable, or modify firmware service(s) 601B-N based upon instructions conveyed in polic(ies) 602 (e.g., in response to changes in context, telemetry, etc.) without the involvement of host OS 400.

For example, based upon polic(ies) 602, orchestrator 501A may install, update, modify, enable or disable any of firmware service(s) 601A-N in each of devices 501A-N in response to the detection of one or more of: an IHS location, an IHS posture (e.g., lid closed, etc.), an IHS identification (e.g., service tag, serial number, etc.), a type of IHS (e.g., manufacturer, model, etc.), an identification or type of heterogeneous computing platform 300, an IHS battery (dis)charge level or rate, an identity or type of connected or available IHS peripherals, a security posture of IHS 200 (e.g., connected to VPN, disposed in a trusted or secure location, etc.), an identity or type of applications 412-414 executed by host OS 400, an identity or type of one of applications 412-414 requesting firmware service(s) 601A-N (e.g., via OEM driver 408), an identification of a user of the IHS, an identification of a user group or role, a user's proximity to the IHS, a user's level of user engagement, detected onlooker(s), a user's personal information (e.g., languages spoken, video or audio preferences, etc.), calendar events or data (e.g., type, time, and duration of a collaboration session, priority or importance of the session, role of the user in the session, recurring status, identities and roles of other participants in the session, etc.), messaging (e.g., email, text messages, etc.) data (e.g., subject, date sent and received, number of related messages, priority, names and roles of addressees, etc.), environmental conditions (e.g., weather, background noise levels, lighting level or quality, etc.), etc.

In some cases, polic(ies) 602 may specify that orchestrator 501A select one or more of a plurality of different AI models (or different instances of the same AI model) to be used for a given operation in response to the IHS being at a certain geographic location, network location, type of audio environment, etc. Any of the contextual and/or telemetry information described herein may be used to create different sets of conditions for rules outlined in polic(ies) 602.

For example, polic(ies) 602 may specify that high-performance AI device 308 be used to apply a more computationally costly AI model (or a larger number of models) under a favorable set of conditions (e.g., if battery level is above a first threshold level, if IHS 200 is connected to AC power, if a certain application or type of application is in execution, if a level of utilization of high-performance AI device 308 and/or sensor hub and low-power AI device 307 is below a threshold level, etc.).

Under a set of less favorable conditions (e.g., if battery level is below a second threshold level, if a certain application or type of application is not in execution, if a level of utilization of high-performance AI device 308 is above a threshold level, etc.), however, polic(ies) 602 may specify that sensor hub and low-power AI device 307 be used to apply a less computationally costly AI model (or fewer models).

In some cases, polic(ies) 602 may also determine whether or under what conditions the user many manually override its rules and settings (e.g., turn a camera or microphone on or off, enable or disable a filter or effect, etc.). Moreover, for different types of users (e.g., engineer, customer support, executive, etc.) who tend to interact with their IHSs 101A-N in different ways, ITDM/OEM service(s) 102 may deploy different rules, AI models, and/or parameters by selecting and deploying different polic(ies) 602.

In many scenarios, systems and methods described herein may enable the collection and management of context and/or telemetry data from one or more of devices 501A-N, host OS 400, and/or applications 412-414.

Figure 7:
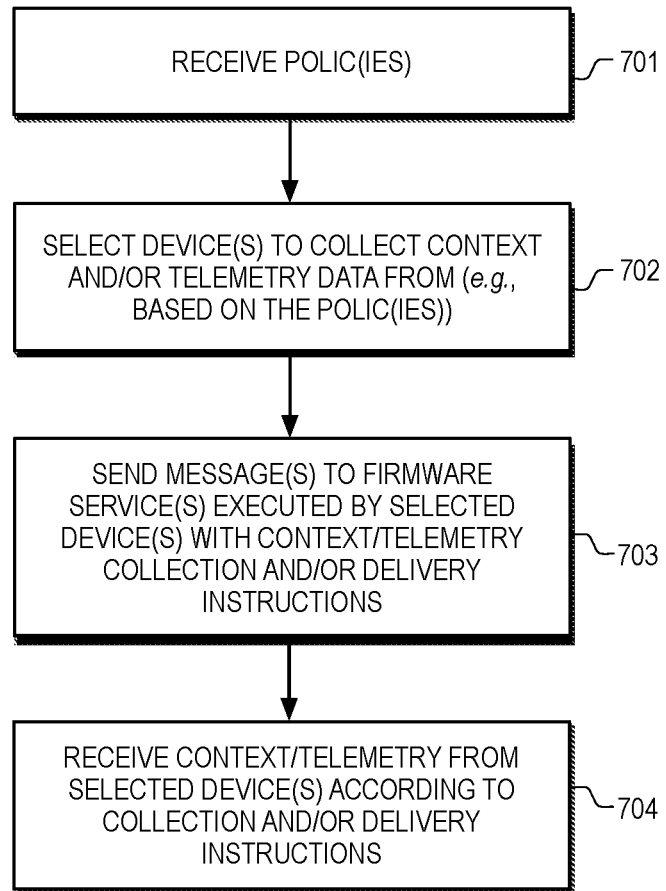
FIG. 7 is a flowchart illustrating an example of a method for collection and management of context and telemetry data in a heterogeneous computing platform, according to some embodiments.

In that regard, FIG. 7 shows a flowchart illustrating an example of method 700 for the collection and management of context and/or telemetry data in heterogeneous computing platform 300. In various embodiments, method 700 may be performed, at least in part, by firmware service(s) 601A of orchestrator 501A.

At 701, orchestrator 501A may receive polic(ies) 602. Polic(ies) 602 may be selected by ITDM/OEM service 102 (e.g., based upon the identities of IHSs 101A-N, service tags, network addresses, user IDs, etc.) and may include rules and/or parameters usable by orchestrator 501A to manage context and/or telemetry data collection operations autonomously and/or independently of host OS 400.

For example, polic(ies) 602 may identify one or more of: context and/or telemetry data to be collected, devices to collect the context and/or telemetry data from, context and/or telemetry data collection parameters (e.g., collection frequency or sampling rate, collection start and end times, a duration of the collection, a maximum amount of telemetry data to be collected, etc.), context and/or telemetry data collection routines, scripts, and algorithms to process and/or produce the context and/or telemetry data, etc. In some cases, each individual piece or set of context and/or telemetry data may include a common clock time stamp (e.g., if requested by polic(ies) 602).

At 702, orchestrator 501A may select one or more devices (e.g., among devices 301-315 of heterogeneous computing platform 300) to collect context and/or telemetry data from, based upon polic(ies) 602. In some cases, selected devices may be dynamically chosen by orchestrator 501A based upon previously collected context and/or telemetry data, as also outlined in polic(ies) 602.

At 703, firmware service(s) 601A of orchestrator 501A may send message(s) to one or more of firmware service(s) 601B-N of selected devices 501A-B with instructions about how to collect any identified context and/or telemetry data and/or how to deliver the collected context and/or telemetry data. For example, such message(s) may inform a given context and/or telemetry collection device which other device(s) to deliver the collected data to, acceptable data format(s) or protocol(s), the manner and/or frequency of data delivery, etc. Moreover, these message(s) may be transmitted between firmware services(s) 601A-N without any involvement by host OS 400.

Firmware service(s) 601A may transmit context and/or telemetry collection messages to any given one of firmware service(s) 601B-N executed by devices 501B-N using a respective one of APIs 502A-N. Conversely, firmware service(s) 601B-N of devices 501B-N may send messages (e.g., acknowledgement, device status, context and/or telemetry data collected, etc.) to firmware service(s) 601A orchestrator 501A using API 502A, again without any involvement by host OS 400. Then, at 704, firmware service(s) 601A of orchestrator 501A receives context and/or telemetry data from selected devices 501B-N following API 502A.

In various implementations, the collected context and/or telemetry data may be used by orchestrator 501A to enforce a wide variety of management decisions based upon polic(ies) 602. Additionally, or alternatively, the collected context and/or telemetry data may be input into AI model(s) executed by device(s) 501A-N.

In some cases, method 700 may be performed at the request of applications 412-414. By maintaining all context and/or telemetry collection routines in firmware 503A-N, method 700 addresses concerns associated with the excessive consumption of IHS resources by OS-level telemetry collection software. When orchestrator 501A serves as the only point of contact for all context and/or telemetry requests targeting devices 501A-N, it may output a stream of context and/or telemetry data to host OS 400.

Figure 8:
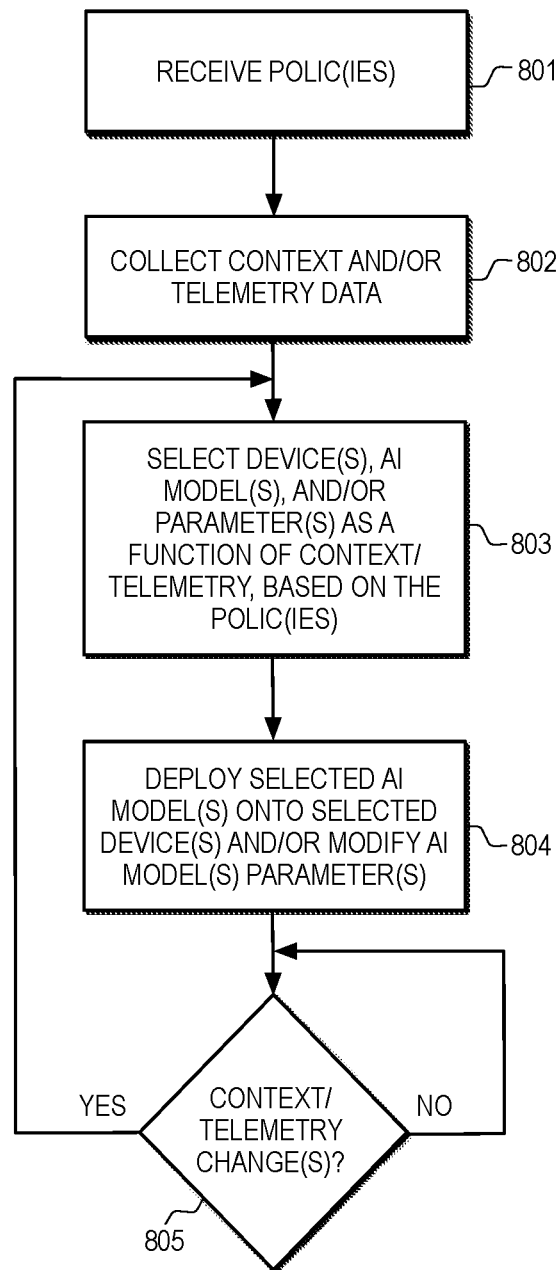
FIG. 8 is a flowchart illustrating an example of a method for deploying an Artificial Intelligence (AI) model in a heterogeneous computing platform based, at least in part, upon ITDM/OEM management polic(ies), according to some embodiments.

FIG. 8 is a flowchart illustrating an example of method 800 for deploying AI models in heterogeneous computing platform 300 based, at least in part, upon ITDM/OEM management polic(ies) 602. In various embodiments, method 800 may be performed, at least in part, by firmware service(s) 601A of orchestrator 501A.

At 801, orchestrator 501A may receive polic(ies) 602 selected by ITDM/OEM service 102 (e.g., based upon the identities of IHSs 101A-N).

At 802, orchestrator 501A may initiate and/or manage context and/or telemetry data collection operations autonomously and/or independently of host OS 400, as shown in method 700 (FIG. 7).

At 803, orchestrator 501A may select device(s) 301-315 onto which to deploy selected AI model(s) and/or AI model parameters as a function on context and/or telemetry data collected at 802 based upon polic(ies) 602. Non-limiting examples of AI model parameters that can be modified and/or influenced during runtime include weights (w) and biases (b).

A "weight" is a type of model parameter that controls a signal (or the strength of the connection) between two neurons (e.g., it determines how much influence the input will have on the output). Conversely, a "bias" is another type of model parameter that provides an additional input into the next layer with a constant value, which is not influenced by the previous layer, but rather has an outgoing connection (with its own weight). In some cases, a bias value of '1' may guarantee that, in a neural network, even when all the inputs are zeros, a particular neuron is activated; whereas a bias value of '0' deactivates that neuron.

Modifying weights or biases may change the structure of a neural network, which in turn modifies an AI model's performance, power consumption, inference accuracy, and/or speed of execution.

In some cases, orchestrator 501A may use at least a subset of context and/or telemetry information—and/or it uses AI mode inferences produced based upon the subset of context and/or telemetry information—to enforce the execution of AI models following rules indicated ITDM/OEM polic(ies) 602. In that regard, it should be noted that an ITDM/OEM may set use polic(ies) 602 to enforce unique rules, triggers, and/or thresholds for selecting AI processing settings for different ones of IHSs 101A-N (or groups of IHSs) with different levels of granularity, based on context and/or telemetry data.

For example, at 803, orchestrator 501A may enforce a policy rule which dictates that a particular device within heterogeneous computing platform 300 be selected to execute a specific AI model (or type of AI model) with certain parameter(s) in response to different context and/or telemetry data, such as, for example: when an IHS is on battery power (or when the battery charge drops below or rises above a minimum value), when the IHS 200 is in a certain location (e.g., at work, at home, within a distance from selected coordinates, etc.), based on hardware utilization (e.g., a level of utilization of one or more of the devices in platform 300 reaches a maximum or minimum value), if the user of IHS 200 belongs to a selected group of users (e.g., "managers," "engineers," etc.), when IHS 200 is manipulated into a given posture, when the user is present or within a selected distance from IHS 200, etc.

At 804, orchestrator may deploy the selected AI model(s) and/or AI model parameters onto selected device(S) 301-315. Generally, an AI model may be executed or deployed as a service. In some cases, a container system (e.g., DOCKER, KUBERNETES, etc.) may operate as a "box" for an AI model that creates reproducible, scalable, and isolated environments where users can set up dependencies so the AI model can work in any desired execution environment, such as, for example, a selected one of the plurality of devices in heterogeneous computing platform 300 (FIG. 3), host OS 400 (FIG. 4), and/or third-party service(s) 105.

At 805, orchestrator 501A may determine if there are any context and/or telemetry data changes (e.g., if the latest data has a value different than a previously collected data value by an amount greater than or equal to a threshold value). If not, control stays with 805. If so, control returns to 803, where orchestrator 501A may select different device(s), AI model(s), and/or parameter(s) to initiate new AI processes or give continuance to ongoing AI processes (e.g., AI model migration).

As such, method 800 provides a mechanism for orchestrator 501A to dynamically modify the provisioning of AI services by heterogeneous computing platform 300 autonomously and/or independently of host OS 400.

In various embodiments, workload characterization AI model(s) may be provisioned and deployed with firmware service(s) 601A and executed by high-performance AI device 308. The output(s) of these workload characterization AI model(s) may include the detection and determination of system state, usage, and/or workloads (and their intensities), and delivered to firmware service(s) 601A.

Other firmware service(s) 601B-N (e.g., aDSP 306, display 309, camera 310, etc.) may receive configuration commands from firmware service(s) 601A to modify IHS settings based upon outputs from the workload characterization model(s), for example, as prescribed by polic(ies) 602. In some cases, host OS 400 may include its own service configured to provide certain configuration modifications (e.g., outside of driver configuration load/mechanisms) and manage and interface with HID input to alert a user of selected operations, and to direct management interfaces to remote services.

Figure 9:
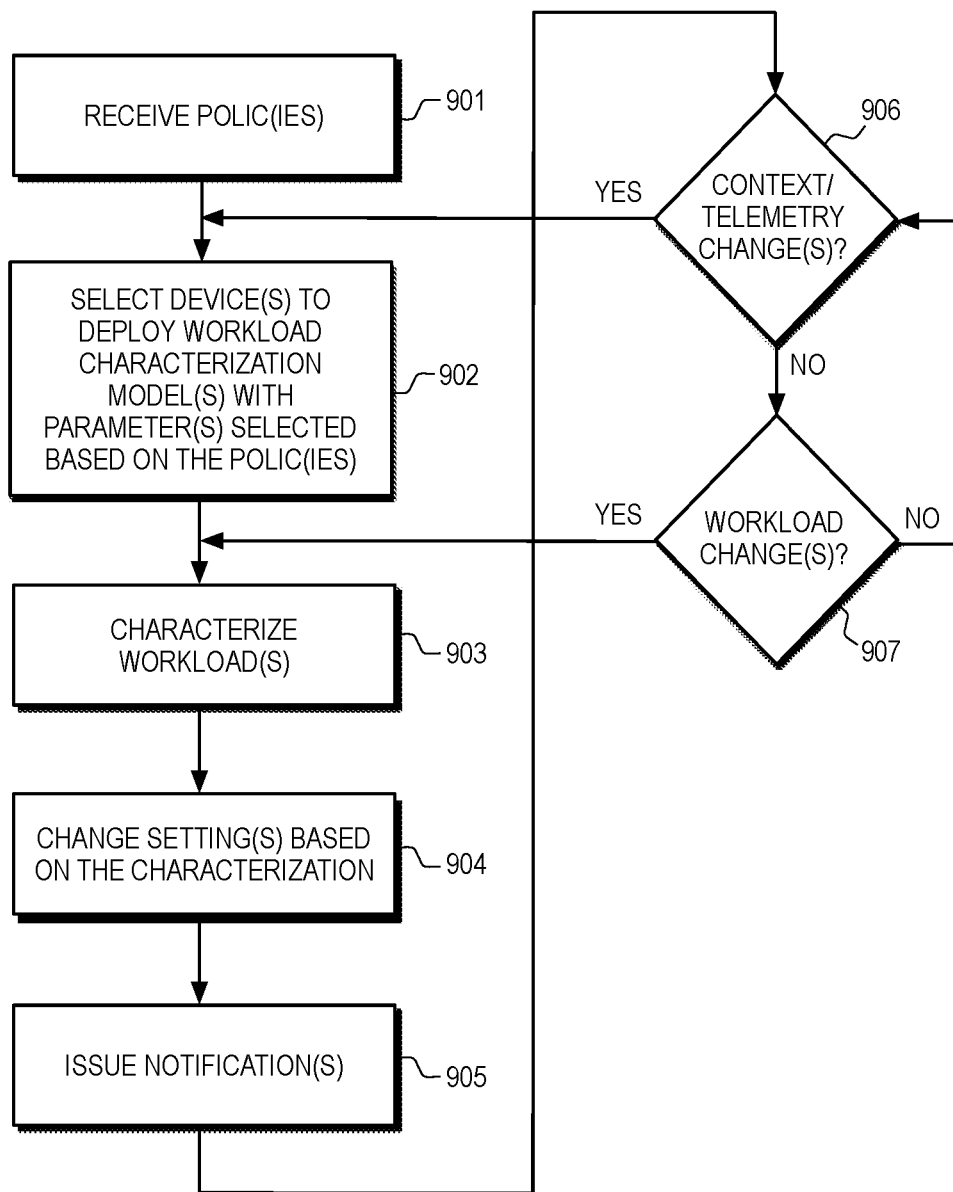
FIG. 9 is a flowchart illustrating an example of a method for usage or workload detection and notification in a heterogeneous computing platform, according to some embodiments.

FIG. 9 is a flowchart illustrating an example of method 900 for usage or workload detection and notification in heterogeneous computing platform 300. In some embodiments, method 900 may be performed, at least in part, through the execution of firmware instructions by devices within heterogeneous computing platform 300 (FIG. 3) of IHS 200 (FIG. 2) implementing one of IHSs 101A-N (FIG. 1).

At 901, firmware service(s) 601A executed by orchestrator 501A receives polic(ies) 602 selected by ITDM/OEM service 102 (e.g., based upon the identities of IHSs 101A-N). At 902, orchestrator 501A may select one or more of devices 501A-N to deploy usage or workload characterization model(s) with parameter(s) selected based upon instructions or rules included in polic(ies) 602. For example, a workload characterization model may be trained to receive context and/or telemetry data as inputs and to identify one or more workloads (or types of workloads) in execution.

In some cases, block 902 may also include collecting context and/or telemetry data, for example, as described in method 700 (FIG. 7), and selecting the one or more device(s), model(s), and/or parameter(s) based upon the context and/or telemetry data as applied to polic(ies) 602. In some cases, the context or telemetry data may include a metric indicative of at least one of: a core utilization, a memory utilization, a network utilization, a battery utilization, a peripheral device utilization, a user's presence, a user's engagement, an IHS location, an IHS posture, an application in execution by the IHS (e.g., an application in a Graphical User Interface or "GUI" foreground, a "background" application, a "minimized" application, etc.).

Block 902 may further include deploying workload characterization AI model(s) in selected device(s). For instance, orchestrator 501A may send message(s) to firmware service(s) provided by selected device(s) (e.g., high-performance AI device 308), without any involvement by host OS 400 to load and execute the workload characterization model(s).

In some implementations, polic(ies) 602 may identify at least one of: the context or telemetry data to be collected, the subset of the plurality of devices from which to collect the context and/or telemetry data, the one or more selected devices for executing one or more selected AI models, or an identification of the one or more AI models. Polic(ies) 602 may also include one or more rules that associate at least one of: (a) the one or more selected devices, or (b) the one or more AI models with predetermined context or telemetry data. In such implementations, orchestrator 501A may be configured to enforce rules, at least in part, based upon a comparison between current context and/or telemetry and the predetermined context and/or telemetry data.

At 903, the selected device(s) may characterize one or more workload(s) of IHS 200 using the workload characterization model(s). In some cases, a workload characterization model may identify patterns of utilization (e.g., core, memory, battery, network, peripherals, etc.) by certain devices 501A-N that are indicative of an ongoing collaboration session, a video game session, a productivity session (e.g., document processor, spreadsheets, presentations, email client, etc.), etc.

Additionally, or alternatively, a workload characterization model may identify patterns of utilization of different types of workloads (e.g., productivity, collaboration, browsing, streaming, video games, etc.) and/or their intensity. In some cases, such workload characterization results may indicate that X % of available IHS resources are executing a first type of workload and Y % of those resources are executing a second type of workload, concurrently. The selected device(s) may then send an indication of workload characterization results to orchestrator 501A without any involvement by host OS 400.

At 904, orchestrator 501A may change one or more IHS settings based, at least in part, upon the characterization results, as instructed by polic(ies) 602. For instance, polic(ies) 602 may include rules that indicate, for each characterized workload, what one or more settings should be. Additionally, or alternatively, polic(ies) 602 may require orchestrator 501A to execute another type of AI model that receives characterization results and/or other context and/or telemetry data as inputs, and that infers the appropriate settings for a given workload.

Examples of IHS settings may include, for at least one of the plurality of devices 501A-N and/or for any peripheral device coupled to IHS 200, at least one of: a power state, a maximum power consumption, a clock speed, a turbo frequency, a multithreading feature, the availability of an accelerator, or a memory allocation. Additionally, or alternatively, such settings may include at least one of: a display's brightness, a display's resolution, a display's color depth, a display's refresh rate, a microphone's gain, or a speaker's volume, a camera's capture resolution, or a camera's refresh rate. Additionally, or alternatively, such settings may include, for at least one of the characterized one or more workloads, at least one of: a network bandwidth, or a connection priority.

At 905, orchestrator 501A may notify at least one of: host OS 400, any of applications 412-414, or a user of IHS 200 about the characterization of the one or more workloads and/or the settings referred to in 904.

At 906, orchestrator 501A may determine if the context and/or telemetry data has changed (e.g., by an amount greater than a threshold value). If so, control returns to 902 where new device(s), AI model(s), and/or parameters may be selected and deployed based upon the application of polic(ies) 602 to the changed context and/or telemetry data. If not, control passes to 907.

At 907, orchestrator 501A determines if there have been changes to one or more workload(s). If not, control returns to 906. If so, control passes to 903, where the new or changed workloads may be (re)characterized.

In modern enterprises, the term "hoteling" (or "office hoteling"), shared workspaces, and co-working offices refer to physical environments where clients, users, or employees can schedule their hourly, daily, or weekly use of individual workspaces, such as office desks, cubicles, or conference rooms-thus serving as an alternative to permanently assigned seating. Generally, hoteling clients, users, or employees access a reservation system to book an individual workspace before they arrive at work, which gives them freedom and flexibility to work where they want to. In some cases, individual workspaces may also be available to users without a reservation system on a first come, first serve basis (e.g., in the lobby of a hotel).

When a client, user, or employee reaches an individual workspace, they bring their own IHS and use the peripheral devices assigned to or otherwise found in that workspace during a work session. In some implementations, each individual workspace may also include a docking station (or "dock") to which the IHS may be coupled during at least a portion of the session, and one or more peripherals may be indirectly connected to the user's IHS via the dock. In some cases, however, the client, user, or employee may choose to use one or more devices integrated into their IHS (e.g., integrated display, integrated GPU, integrated microphone, integrated speakers, integrated webcam, etc.), instead of a workspace peripheral device.

In some situations, for example, a user may arrive at their office, or a shared space, to conduct a secure conference call or collaboration session without enough time to find each peripheral device they want to use, and to configured them manually. Moreover, the user may not be familiar with some of the peripheral devices' settings or options (e.g., audio, video, display, etc.) are, especially to the extent those devices are assigned to a shared space and/or do not belong to them.

Yet there is no known mechanism, at the firmware layer, to automatically perform system detection and setting configuration recommendations based on contextual and/or telemetry data (e.g., hardware, environment, and usage needs) for optimal behavior, without requiring OS-based agent or application operations.

To address these, and other concerns, systems and methods described herein may provide tools for managing peripheral device settings based upon context using heterogeneous computing platforms. In some cases, these systems and methods may include a firmware service set executed by respective devices within heterogeneous computing platform 300 for configuring and updating peripheral device settings based upon context and/or telemetry data, without any involvement by any host OS. For example, these systems and methods may detect connected external devices and may modify competing device settings to resolve potential or actual conflicts among them using an arbitration algorithm.

In some implementations, firmware service(s) 601A running in orchestrator 501A (e.g., sensor hub 307, EC/BMC 209) may be responsible for collecting: polic(ies) 602 (e.g., from host OS 400 or remote service(s) 102), BIOS build time characteristics, runtime system index state, aggregated sensor data, and/or peripheral device configuration settings. Firmware service(s) 601A may infer and report contextual information, and then configure other firmware services (e.g., executed by display controller 309, camera controller 310, aDSP 306, VPU 311, EC/BMC 209, sensors 210, peripheral controller(s) 314, etc.) with settings selected, at least in part, using context or telemetry data.

Firmware service(s) 601A may also collect system capabilities from inbox device population, as well as external device capabilities, as presented by peripheral controller(s) 314. Based on polic(ies) 602 provided and contextual/ telemetry input device 501A-N, firmware service(s) 601A may instruct other firmware service(s) 601C executed by peripheral controller(s) 314 to configure internal devices and to modify external device configurations as appropriate.

In cases where orchestrator 501A is implemented by sensor hub 307, firmware service(s) 601A may also notify firmware service(s) 601B executed by EC/BMC 209 of changes in state. In addition, firmware service(s) 601A may notify any suitable OS service within OS 400 for user notification and OS-level actions. Based at least in part upon responses provided by firmware service(s) 601B, firmware service(s) 601A may select IHS settings and notify OS 400 of HID commands and/or operations for responsive engagement and actions.

Alternatively, in cases where orchestrator 501A is implemented by EC/BMC 209, EC/BMC 209 may execute firmware service(s) 601B configured to receive the aforementioned context or telemetry information from sensor hub 307 without any involvement by host OS 400. In some cases, polici(ies) 602 may be received and processed by firmware service(s) 601B.

Firmware service(s) 601B of EC/BMC 209 may be responsible for receiving communications from firmware service(s) 601A and for updating firmware service(s) 601C, executed, for example, by peripheral controller(s) 314, as prescribed by polic(ies) 602. Additionally, firmware service(s) 601B may receive responses from firmware service(s) 601C modify user notification actions through firmware service(s) 601A and notification to host OS 400 and/or optimization/customization application 412 for runtime management operation.

Firmware service 601C, running on a device connection or peripheral controller 314 (e.g., a Thunderbolt PD Controller, etc.) may be responsible for detecting peripheral device capabilities and providing reported results to firmware service(s) 601A for evaluation and determination. Additionally, firmware service(s) 601C may be responsible for configuring external devices or gating devices from specific endpoints, for example, if external endpoints are deemed undesirable or problematic from the perspective of firmware service(s) 601A with respect to the enforcement of polic(ies) 602 based upon context/telemetry data.

Other firmware service(s) executed by other devices 301-315 may be responsible for delivering capabilities and context to FW Service B and configuring device capability and enumeration variables to host OS 400 based on polic(ies) 602.

Host OS 400 may receive peripheral device settings or configuration information from firmware service(s) 601A. Examples of host OS 400's behaviors may include, but are not limited to, updating firmware service(s) and/or modifying ITDM's policy settings and configurations, and OS level hints or cues for contextual or telemetry changes. In some cases, host OS 400 may also be responsible for configuring OS variables and system assist operations for device arrival (e.g., connection), departure (e.g., disconnection), and/or prioritization (connection priority) activities, as defined by polic(ies) 602 and/or an arbitration algorithm.

ITDM/OEM service(s) 102 may provide a remote management console responsible for configuring system policy and configurations to manage system thresholds and policy settings. In other implementations, however, such management console may be provided locally. Polic(ies) 602 may be implemented through host OS 400 or through remote management via firmware service(s) 601B of EC/BMC 209.

To illustrate the foregoing, FIG. 10 is a flowchart showing an example of method 1000 for managing peripheral device settings based upon context using heterogeneous computing platform 300. For example, method 1000 may be performed, at least in part, by orchestrator 501A of heterogeneous computing platform 300 in any given one of managed IHSs 101A-N.

Particularly, method 1000 may be performed, at least in part, through the execution of firmware instructions 503A by orchestrator 501A (e.g., sensor hub 307 or EC/BMC 209) within heterogeneous computing platform 300 (FIG. 3) of IHS 200 (FIG. 2) implementing one of IHSs 101A-N (FIG. 1).

At 1001, firmware service(s) 601A executed by orchestrator 501A may receive polic(ies) 602 selected by ITDM/OEM service 102 (e.g., based upon identities of IHSs 101A-N).

At 1002, orchestrator 501A may instruct one or more of devices 501B-N to collect any of the aforementioned context and/or telemetry data, for example, as previously described (e.g., without any involvement by any host OS). Polic(ies) 602 may identify context and/or telemetry data to be collected and the set of devices from which to collect the data.

Polic(ies) 602 may also include one or more rules, such that each rule associates any combination of contextual or telemetry information with a plurality of peripheral device settings and/or modifications thereto. For example, the contextual or telemetry information may include: a metric indicative of a core utilization, a memory utilization, a network utilization, a battery utilization, or a peripheral device utilization, a presence of the user, an engagement of the user, an IHS location, an IHS posture, an application in execution by IHS 200. Additionally, or alternatively, the contextual or telemetry information may include: an indication of whether a collaboration session or conference call is (a) secure or unsecure, (b) private or public, (c) confidential or nonconfidential, or (d) privileged or non-privileged. Additionally, or alternatively, the contextual or telemetry information may include: an indication of a time to a collaboration session or conference call and/or an indication that IHS 200 is located in a hoteling environment or conference room.

At 1003, orchestrator 501A may determine whether the aforementioned context or telemetry data matches a policy rule. If not, control returns to 1002 (or 1001).

If so, at 1005, orchestrator 501A may trigger a modification one or more settings for one or more peripheral devices coupled to heterogeneous computing platform 300, for example, by communicating the settings and/or modification to peripheral controller(s) 314 configured to implement such settings in each respective device without any involvement by any host OS.

In some cases, the peripheral devices comprise an external display, an integrated display, a loudspeaker, or a headset. Moreover, to trigger a modification of a peripheral device setting, orchestrator 501A may be configured to select an output device between a plurality of peripheral devices of the same type. For example, such settings may include a wireless connection or disconnection between IHS 200 and a peripheral device.

FIG. 11 is a flowchart illustrating an example of another method 1100 for managing peripheral device settings based upon context using heterogeneous computing platform 300. Particularly, method 1100 may be performed, at least in part, by EC/BMC 209 and/or other devices of heterogeneous computing platform 300 in any given one of managed IHSs 101A-N.

At 1101, EC/BMC 209 may receive one or more messages from orchestrator 501A (from 1105 in FIG. 11) to trigger a modification one or more peripheral device settings. For example, EC/BMC 209 may configure IHS 200 to connect or disconnect to a particular peripheral device in response to any of the contextual or telemetry information collected matching a rule in polic(ies) 602. Then, at 1102, EC/BMC 209 may modify the setting(s) as requested by orchestrator 501A, for example, as part of its enforcement of polic(ies) 602, by sending commands to peripheral controller(s) 314 without any involvement by host OS 400.

As such, systems and methods described herein may be deployed to intelligently manage peripheral device settings in response to context and/or telemetry data-based determinations using only the firmware layer, completely independently of host OS components. Additionally, or alternatively, these systems and methods may provide firmware-managed peripheral device settings with reduced host OS interaction or management, so as to provide managed prioritized system configuration and/or persistent behaviors and experiences in agentless environments.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a heterogeneous computing platform; and
a memory coupled to the heterogeneous computing platform, wherein the memory comprises a plurality of sets of firmware instructions, wherein each of the sets of firmware instructions, upon execution by a respective device among a plurality of devices of the heterogeneous computing platform, enables the respective device to provide a corresponding firmware service, and wherein at least one of the plurality of devices operates as an orchestrator configured to:
receive context or telemetry data collected by at least one of the plurality of devices, wherein the context or telemetry data comprises an indication of whether a collaboration session or conference call is at least one of: (a) secure or unsecure, (b) private or public, or (c) confidential or nonconfidential; and
trigger a modification of a setting for a peripheral device based, at least in part, upon the context or telemetry data.

2. The IHS of claim 1, wherein the heterogeneous computing platform comprises at least one of: a System-On-Chip (SoC), a Field-Programmable Gate Array (FPGA), or an Application-Specific Integrated Circuit (ASIC).

3. The IHS of claim 1, wherein the orchestrator comprises at least one of: a sensing hub, an Embedded Controller (EC), or a Baseboard Management Controller (BMC).

4. The IHS of claim 1, wherein the context or telemetry data comprises a metric indicative of at least one of: a core utilization, a memory utilization, a network utilization, a battery utilization, or a peripheral device utilization.

5. The IHS of claim 1, wherein the context or telemetry data comprises a metric indicative of at least one of: a presence of the user, an engagement of the user, an IHS location, an IHS posture, or an application in execution by the IHS.

6. The IHS of claim 1, wherein to trigger the modification of the peripheral device setting, the orchestrator is configured to select an output device between a plurality of peripheral devices.

7. The IHS of claim 1, wherein the context or telemetry data comprises an indication of a time to the collaboration session or conference call.

8. The IHS of claim 1, wherein the context or telemetry data comprises an indication that the IHS is located in a hoteling environment or conference room.

9. The IHS of claim 1, wherein the peripheral device comprises: an external display, an integrated display, a loudspeaker, or a headset.

10. The IHS of claim 1, wherein the setting comprises a wireless connection or disconnection between the IHS and the peripheral device.

11. The IHS of claim 1, wherein to receive the context or telemetry data, the orchestrator is configured to receive a message from a firmware service executed by one or more of the plurality of devices via an Application Programming Interface (API) without any involvement by any host Operating System (OS).

12. The IHS of claim 1, wherein the orchestrator is configured to instruct a selected device among the plurality of devices to execute an Artificial Intelligence (AI) model configured to arbitrate a conflict between peripheral devices available to the IHS based, at least in part, upon the context or telemetry data.

13. The IHS of claim 12, wherein to instruct the selected device, the orchestrator is configured to send a message to the selected device via an Application Programming Interface (API) without any involvement by any host Operating System (OS).

14. The IHS of claim 1, wherein to trigger the modification, the orchestrator is configured to send a message to an Embedded Controller (EC) or a Baseboard Management Controller (BMC) via an Application Programming Interface (API) without any involvement by any host Operating System (OS).

15. The IHS of claim 14, wherein to trigger the modification, EC or BMC is configured to send a message to a peripheral device controller without any involvement by any host OS.

16. The IHS of claim 1, wherein the orchestrator is configured to trigger the modification in accordance with a policy received from an Information Technology Decision Maker (ITDM) or Original Equipment Manufacturer (OEM).

17. The IHS of claim 16, wherein the policy comprises one or more rules that associate at least one of: (a) the peripheral device, the setting, or the modification to the setting; with (b) the context or telemetry data.

18. A memory device having a plurality of sets of firmware instructions, wherein each of the sets of firmware instructions is executable by a respective device among a plurality of devices of a heterogeneous computing platform in an Information Handling System (IHS) to enable the respective device to provide a corresponding firmware service, and wherein a given one of the plurality of sets of firmware instructions, upon execution by an Embedded Controller (EC) or Baseboard Management Controller (BMC) among the plurality of devices, cause the EC or BMC to:

receive context or telemetry data collected by at least one of the plurality of devices; and trigger a modification of a setting for a peripheral device based, at least in part, upon the context or telemetry data, wherein at least one of: (a) to receive the context or telemetry data, an orchestrator is configured to receive a message from a firmware service executed by one or more of the plurality of devices via an Application Programming Interface (API) without any involvement by any host Operating System (OS); or (b) to trigger the modification, the orchestrator is configured to send a message to a firmware service executed by the peripheral device via an API without any involvement by any host OS.

19. A method, comprising:

receiving, at an orchestrator of a heterogeneous computing platform in an Information Handling System (IHS), context or telemetry data collected by at least one of a plurality of devices integrated into the heterogeneous computing platform; and triggering, by the orchestrator, a modification of a setting for a peripheral device in accordance with a policy received from an Information Technology Decision Maker (ITDM) or Original Equipment Manufacturer (OEM), wherein the policy comprises one or more rules that associate at least one of: (a) the peripheral device, the setting, or the modification to the setting; with (b) the context or telemetry data.

\* \* \* \* \*